United States Patent [19]
Harumoto et al.

[11] Patent Number: 6,021,242
[45] Date of Patent: Feb. 1, 2000

[54] DIFFRACTION GRATING TYPE BAND-PASS FILTER AND METHOD OF MAKING THE SAME

[75] Inventors: Michiko Harumoto; Toru Iwashima, both of Yokohama, Japan

[73] Assignee: Sumitomo Electric Industries, Osaki, Japan

[21] Appl. No.: 09/121,184

[22] Filed: Jul. 23, 1998

[30] Foreign Application Priority Data

Jul. 23, 1997 [JP] Japan ..................................... 9-197249
Jun. 4, 1998 [JP] Japan ................................... 10-155994

[51] Int. Cl.$^7$ ...................................................... G02B 6/34
[52] U.S. Cl. ................................. 385/37; 385/27; 385/28
[58] Field of Search .................................. 385/37, 27, 28, 385/29, 30, 14, 129, 130, 10

[56] References Cited

U.S. PATENT DOCUMENTS 5,887,094  3/1999  Bakhti et al. ............................. 385/28
5,903,690  5/1999  Starodubov et al. ...................... 385/37
5,953,471  9/1999  Espindola et al. ........................ 385/37

OTHER PUBLICATIONS

Mizrahi, et al., "Fiber–grating transmission filters for use in all–fiber demultiplexer", OFC '94 Technical Digest, pp. 52–53.

Primary Examiner—Phan T. H. Palmer
Attorney, Agent, or Firm—Pillsbury Madison & Sutro LLP

[57] ABSTRACT

A band-pass filter formed in an optical waveguide, provided with a diffraction grating group having a period Λ of refractive index fluctuation changing in an axial direction with substantially a constant changing width Δn, comprises two periodic refractive index variable areas having periodes Λ different from each other; a zero area, disposed therebetween, having substantially a constant refractive index; and boundary areas, disposed between the zero area and the respective periodic refractive index variable areas, in which the changing width of refractive index monotonously changes between 0 and Δn.

14 Claims, 22 Drawing Sheets

DIFFRACTION GRATING TYPE BAND-PASS FILTER AND METHOD OF MAKING THE SAME

BACKGROUND OF THE INVENTION

1. Field of the Invention

The present invention relates to a band-pass filter using a diffraction grating formed in an optical waveguide, and a method of making the same.

2. Related Background Art

Optical fiber-gratings have been known as a device used in optical fiber communication systems. In an optical fiber-grating, a light component having a specific wavelength is reflected according to a period between adjacent gratings, and light components having specific wavelengths are reflected according to respective periods between other gratings. Accordingly, since light in a specific wavelength region can be effectively reflected, the optical fiber-grating has been used as a reflecting device.

On the other hand, it has been known to combine optical fiber-gratings having different periods together so as to form a band-pass filter. An example of such a band-pass filter is disclosed in a paper titled "Fiber-grating transmission filters for use in an all-fiber demultiplexer" (OFC'94 Technical Digest: TuL6). It discloses a technique in which two pieces of optical fiber-gratings made of chirp gratings having different reflection wavelength regions are combined together, thereby transmitting therethrough light in a desired band of a specific wavelength region.

SUMMARY OF THE INVENTION

This kind of band-pass filter using chirp gratings, however, may yield a large amount of transmission loss in the transmission wavelength band, and it is difficult to narrow down its transmission wavelength band. Further, light reflection may be also occur in a wavelength region outside of the range in which filtering is to be effected. Accordingly, it is difficult for such a band-pass filter to accurately separate only a specific wavelength from a wide wavelength region.

Therefore, it is an object of the present invention to provide a band-pass filter having a favorable transmission efficiency, and a method of making the same.

In order to overcome the above-mentioned problem, the present invention provides a diffraction grating type band-pass filter in which a diffraction grating area having a periodic refractive index change along an axial direction is formed within an optical waveguide and which is adjusted so as to transmit therethrough light in a predetermined wavelength band. The diffraction grating area comprises: first and second periodic refractive index variable areas in which refractive index is varied with a period monotonously changing along the axial direction with substantially a constant changing width of $\Delta n$ so as to form a plurality of diffraction gratings such that the shortest period of one area is longer than the longest period of the other; a zero area which has substantially a constant refractive index and which is disposed between the first and second periodic refractive index variable areas; and first and second boundary areas which are respectively disposed therebetween and which have refractive indexes continuously and monotonously changing with a width of between $\Delta n$ and 0.

In a band-@ass filter in accordance with the present invention, the first periodic refractive index variable area in which the changing width of refractive index is constantly held at $\Delta n$, the first boundary area in which the changing width of refractive index monotonously decreases from $\Delta n$ to 0, the zero area in which the refractive index is substantially constant, the second boundary area in which the changing width of refractive index monotonously increases from 0 to $\Delta n$, and the second periodic refractive index variable area in which the changing width of refractive index is constantly held at $\Delta n$ are successively formed along the optical axis. Also, in the first and second periodic refractive index variable areas, a plurality of diffraction gratings having different periodes are arranged, while the shortest period of one area is made longer than the longest period of the other. Consequently, different wavelength bands of light are reflected by the first and second periodic refractive index variable areas so as to be blocked thereby. On the other hand, the zero area disposed therebetween transmits light since there is no diffraction grating. As a consequence of such a configuration, the blocking wavelength band and transmission wavelength band are accurately defined. By contrast, when two periodic refractive index variable areas are prepared independently of each other, it is quite difficult to accurately define the range of transmission wavelength band.

The boundary area formed between each periodic refractive index variable area and the zero area is effective in improving the transmission loss within the transmission wavelength band. It is due to the fact that, when the changing width of refractive index in the boundary area is rapidly changed from $\Delta n$ to 0 or is repeatedly decreased or increased, the reflection caused by the diffraction grating becomes complicated, thereby enhancing the transmission loss-within the transmission wavelength band. In the present invention, such a complicated reflection would not occur, whereby the transmission loss can be suppressed.

Preferably, assuming that the length of each of the first and second boundary areas in their axial direction is L, the changing width of refractive index at a given position in the boundary area separated by a distance of x from a boundary position with respect to the zero area is expressed by $\Delta n \cdot f(x)$ using a given function $f(x)$ which satisfies $f(0)=0$ and $f(L)=1$, the function $f(x)$ monotonously and smoothly increasing from x=0 to L. This configuration is effective in suppressing the above-mentioned transmission loss.

Further, this given function $f(x)$ is preferably a function having an inflexion point within the range of $L/2 \leq x < L$. When refractive index is changed in conformity to such a function, the changing width of refractive index mildly changes in the proximity of the boundary with respect to the zero area and the boundary with respect to each refractive index variable area. The inventors have confirmed that, as this given function $f(x)$, $f(X)=\cos^2(\pi(L-x)/2L)$ is preferable.

Also, outside the first and second periodic refractive index variable areas, first and second end areas in which the changing width of refractive index monotonously changes between $\Delta n$ and 0 may further be provided, respectively. It is assumed that, when the areas outside of the periodic refractive index variable areas are thus formed, reflections generated by combinations of the respective gratings forming the periodic refractive index variable areas and end areas cancel each other, thereby decreasing the reflection power generated outside the band.

For forming such a blocking characteristic, assuming that a rate by which Bragg wavelength, determined by a period of the diffraction grating, changes per unit axial length is $\Delta P$ (nm/mm), and that the amplitude of a periodic refractive index variable area is Δn, it has been found that the blocking ratio (ratio of transmitted power to incident power) in the refractive index variable area is obtained by satisfying the following expression:

$$-3.67 \times (\Delta n)^2 \times 10^6 / \Delta P \leq -10 \text{(dB)}$$

On the other hand, the present invention provides a method of making a diffraction grating type band-pass filter, comprising the step of forming a diffraction grating by projecting ultraviolet light by way of a phase mask having a predetermined form onto a ultraviolet-sensitive optical waveguide so as to cast an interference fringe thereon, in which the interference fringe is projected by irradiating a ultraviolet beam while scanning it along an optical axis of the optical waveguide; the scanning being effected at a constant speed of v1 in a first area, with a speed monotonously accelerating from $v_1$ to $v_2$ in a second area continuous with the first area, at a constant speed of $v_2$ in a third area continuous with the second area, with a speed monotonously decelerating from $v_2$ to $v_1$ in a fourth area continuous with the third area, and again at the constant speed of $v_1$ in a fifth area continuous with the fourth area.

When ultraviolet light irradiates a ultraviolet-sensitive optical waveguide, its refractive index can be changed according to the quantity of irradiated light. There has been known a method in which, by casting an interference fringe, the quantity of irradiated ultraviolet light is changed depending on places, so as to change refractive index locally, thereby forming a diffraction grating. In the method of the present invention, the scanning speed upon irradiating the ultraviolet beam is changed so as to control the quantity of irradiated light. As a consequence, the diffraction type band-pass filter in accordance with the present invention can be made easily.

Scanning may further be carried out such as to monotonously decelerate from a predetermined speed $v_3$ to $v_1$ in an area precedent to the first area, and monotonously accelerate from $v_1$ to $v_3$ in an area subsequent to the fifth area.

In this case, a diffraction grating type band-pass filter comprising end areas on both side of the above-mentioned refractive index variable areas can be obtained.

Upon acceleration and deceleration in the scanning, the scanning speed may be accelerated and decelerated in conformity to a $\cos^2$ function, respectively. As a consequence, the changing width of refractive index can be controlled according to the scanning speed.

Further, scanning may be carried out such that, while a spectral characteristic of light transmitted through the optical waveguide is monitored, subsequent to a first ultraviolet beam scanning operation, a second or later ultraviolet beam scanning operation is effected at each point with a scanning speed obtained when a scanning speed at this point upon the previous scanning operation is multiplied by a predetermined coefficient, and the scanning is terminated at a point of time when the spectral characteristic of the transmitted light reaches a desired spectral characteristic.

In this case, a diffraction grating type band-pass filter having a desired spectral characteristic can be obtained easily and securely.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5A is a view showing a phase pattern of a phase grating used for making the first embodiment, whereas FIG. 5B is a view showing a refractive index profile of the filter made thereby;

FIG. 7A is a view showing a refractive index profile in the first embodiment, whereas

FIG. 18A is a view showing a refractive index profile of the diffraction grating type band-pass filter in a second embodiment in dance with the present invention, whereas

FIG. 19A is view showing a refractive index profile of the diffraction grating type band-pass filter in a modified example of the second embodiment, whereas

FIG. 20A is showing a phase pattern of a phase grating used for making the second embodiment, whereas FIG. 20B is a view showing a refractive index profile of the filter made thereby;

DETAILED DESCRIPTION OF THE PREFERRED EMBODIMENTS

In the following, embodiments of the present invention will be explained in detail with reference to the accompanying drawings. Among the drawings, constituents identical to each other will be referred to with numerals or letters identical to each other without repeating their overlapping explanations.

Figure 1:
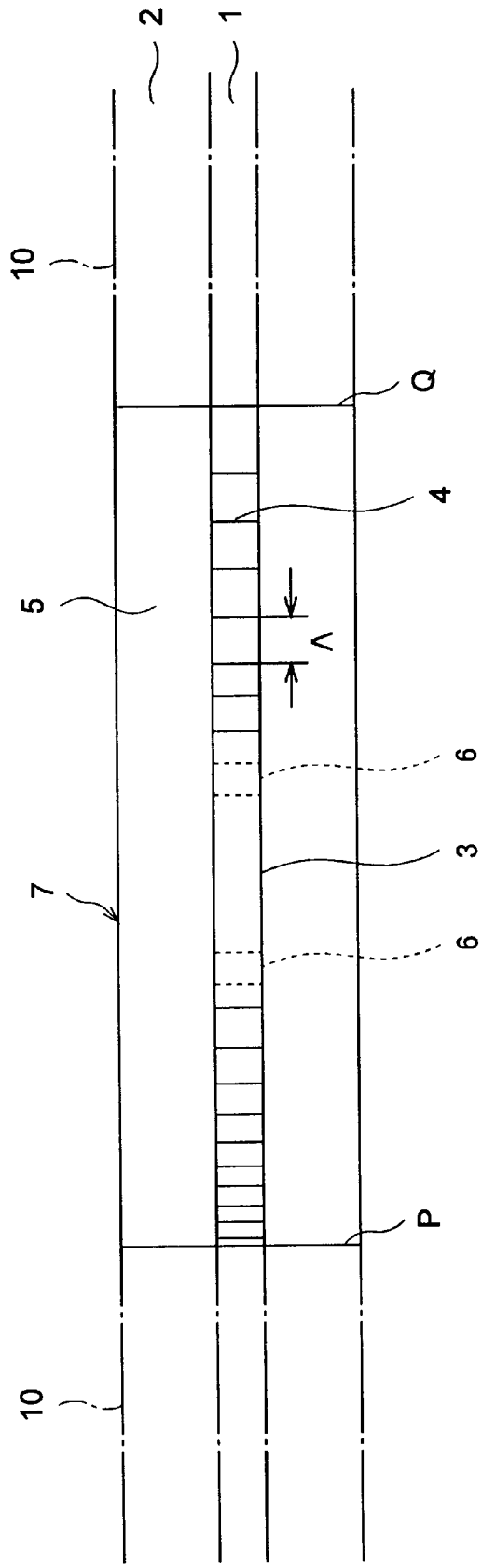
FIG. 1 is a view showing the configuration of a diffraction grating type band-pass filter in accordance with a first embodiment of the present invention.
Figure 2:
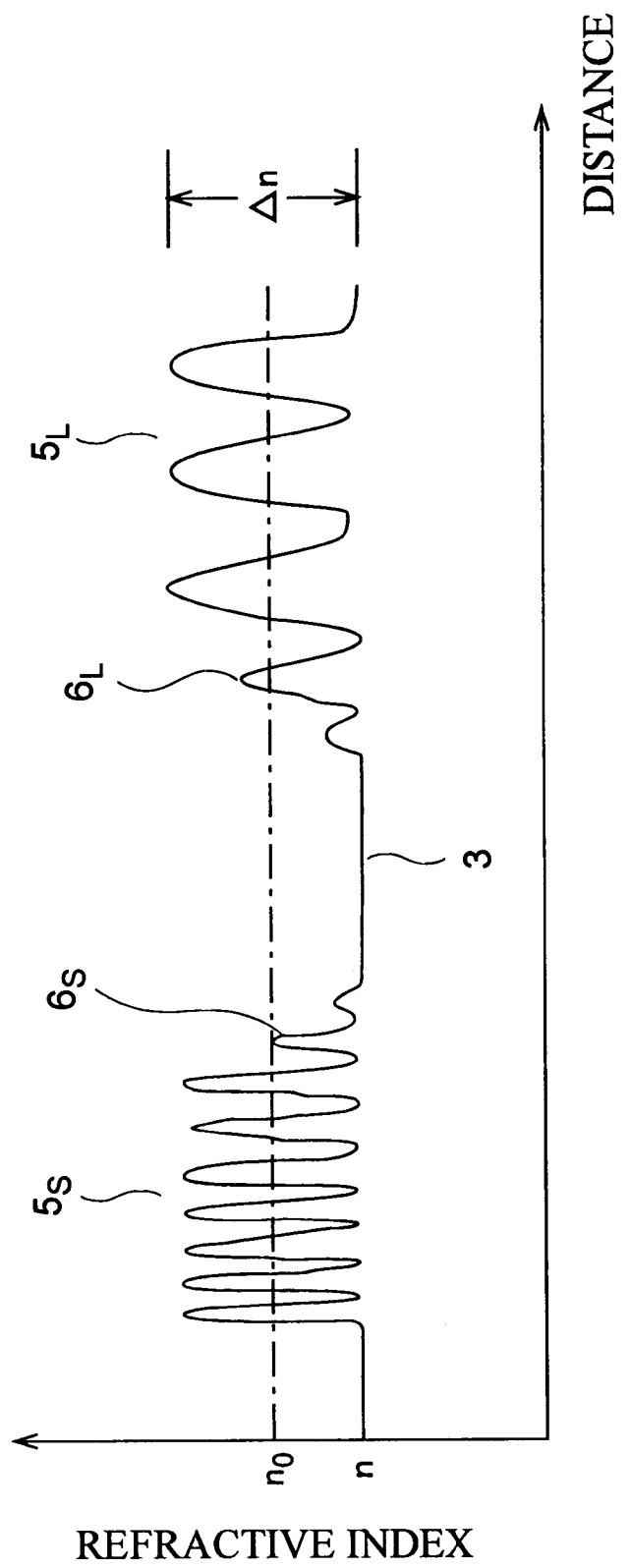
FIG. 2 is a partly enlarged view showing a refractive index distribution of the diffraction grating type band-pass filter shown in FIG. 1.
Figure 3:
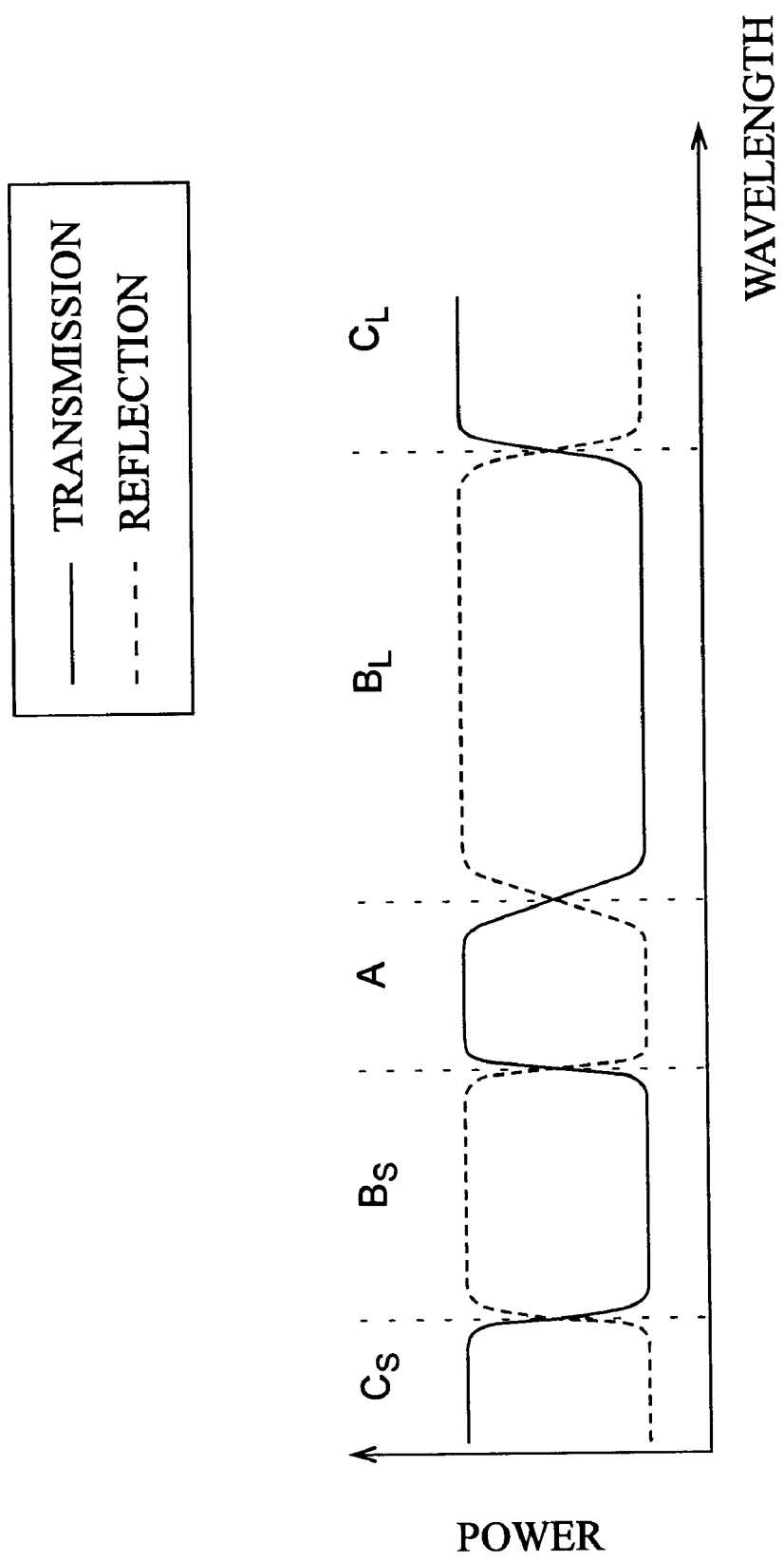
FIG. 3 is a schematic view showing wavelength characteristics of transmission and reflection powers in the first embodiment.

Referring to FIGS. 1 to 3, the configuration of a first embodiment of the diffraction grating type band-pass filter in accordance with the present invention will be explained. FIG. 1 is an overall view showing the configuration of this embodiment, whereas FIG. 2 is a view showing the refractive index distribution in FIG. 1 under magnification.

In FIGS. 1 and 2, a diffraction grating type band-pass filter 7 formed in an optical waveguide 10 has a plurality of diffraction gratings 4 which are formed by periodically changing the refractive index of a core 1 in a section extending from a first end P to a second end Q of the optical waveguide 10. The period $\Lambda$ of these diffraction gratings 4 basically monotonously increases in the axial direction, i.e., from P to Q, while $\Delta n$ which is the changing width of refractive index is held substantially constant, whereby periodic refractive index variable areas 5 ($5_S$, $5_L$) are formed on the sides of both ends P, Q. Namely, the periodic refractive index variable area $5_S$ having relatively short periodes $\Lambda$ is disposed on the first end P side, whereas the periodic refractive index variable area $5_L$ having relatively long periodes $\Lambda$ is disposed on the second end Q side, the shortest period in the area $5_L$ being set longer than the longest period in the area $5_S$. At the intermediate area between these two periodic refractive index variable areas 5, there is a zero area 3 having substantially a constant refractive index. Disposed between the zero area 3 and the respective periodic refractive index variable areas $5_S$, $5_L$ are boundary areas $6_S$, $6_L$ in which the changing width of refractive index monotonously changes between $\Delta n$ and 0.

In the periodic refractive index variable areas 5 of such a diffraction grating type band-pass filter 7, in a diffraction grating 4 having an average refractive index of $n_0$ and a period of $\Lambda$ in the core 1, reflection with a reflection wavelength of $\lambda=2n_0\Lambda$ occurs according to Bragg's diffraction condition. Here, within the periodic refractive index variable areas 5, since they are configured such that the period $\Lambda$ changes along their axis, wavelengths of light are respectively reflected according to thus formed various periodes, thereby forming a reflection area for reflecting a specific wavelength range of light.

FIG. 3 is a schematic view showing wavelength characteristics of transmission and reflection of the diffraction grating type band-pass filter 7. In this drawing a solid line represents a transmission power distribution and a dot line represents a reflection power distribution. In the periodic refractive index variable area $5_L$ formed with a diffraction grating group having a relatively long period and in the periodic refractive index variable area $5_S$ formed with a diffraction grating group having a relatively short period, as light components having wavelengths corresponding to the periodes of their diffraction gratings are reflected, wavelength regions $B_L$, $B_S$ of light are reflected, respectively. These wavelength regions will be referred to as blocking wavelength regions in the following. In the zero area 3, by contrast, since it has a constant refractive index and is not provided with the diffraction grating 4, no reflection occurs. Accordingly, the diffraction grating type band-pass filter 7 transmits therethrough the light component corresponding to the wavelength band A between the blocking wavelength regions $B_L$ and $B_S$. This wavelength band will be referred to as transmission wavelength region in the following. Similarly, no reflection occurs in a region $C_L$ having a wavelength longer than the blocking wavelength region $B_L$ and a region $C_S$ having a wavelength shorter than the blocking wavelength region $B_S$, whereby light of these wavelength regions of light is transmitted.

The periodic refractive index variable areas 5 are formed when an optical waveguide having a photosensitive core made of a silica glass doped with germanium or the like is irradiated with coherent ultraviolet light. For providing the coherent light, two-beam interference method or phase mask method is mainly used. The two-beam interference method is advantageous in that any period of grating can be made by controlling the angle of interference of two ultraviolet beams. In the phase mask method, since a pattern (period) of a phase grating is transcribed onto the optical waveguide, the periodic refractive index variable areas 5 can be made with a high reproducibility by forming the phase grating pattern such that the grating period changes along the axis of the optical waveguide.

In order to form the zero area 3 in which the changing width $\Delta n$ of refractive index becomes substantially zero, when making a series of periodic refractive index variable areas 5 by irradiating ultraviolet light, there may be employed a technique in which a light-shielding mask for blocking the ultraviolet light is applied to the zero area 3 or a technique in which an intermediate part of the phase grating is provided with a light-shielding portion beforehand.

Figure 4:
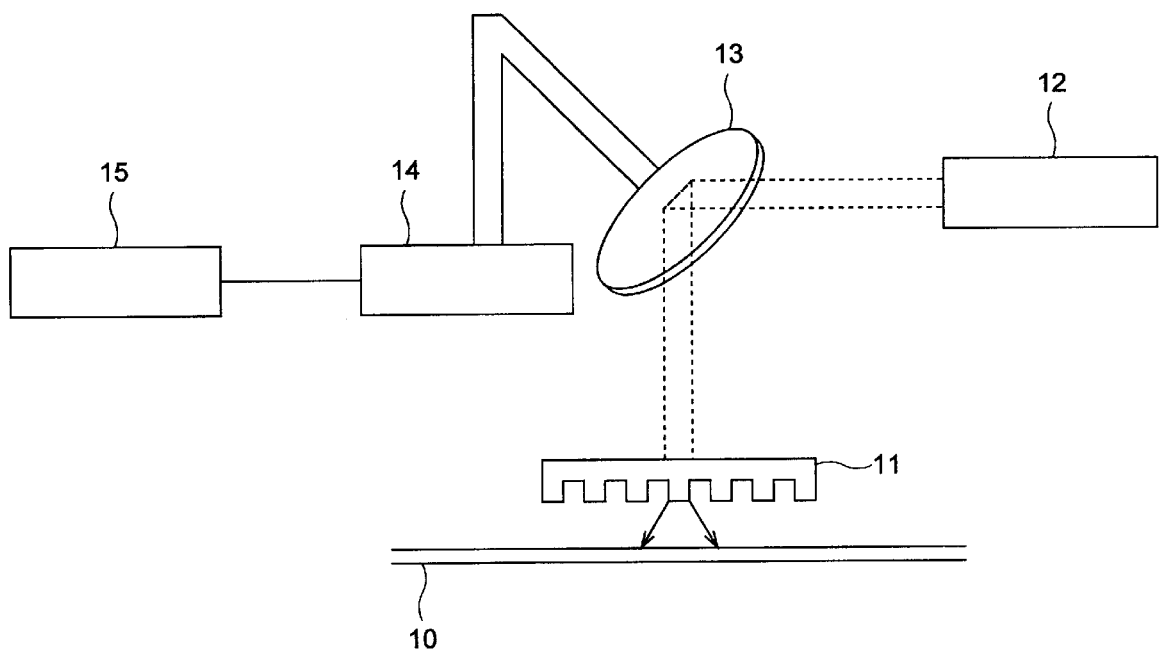
FIG. 4 is a view showing a system for making the diffraction grating type band-pass filter in accordance with the present invention.

FIG. 4 is a view showing an apparatus for making the diffraction grating type band-pass filter 7 shown in FIG. 1. This apparatus comprises a phase grating 11 for projecting a pattern of a diffraction grating having a desired filter characteristic onto an optical fiber 10 to be irradiated with light, a light source 12 for ultraviolet light which becomes irradiation light, a total reflection mirror 13, a movable stage 14 adapted to hold the total reflection mirror 13 and move it in the axial direction of the optical waveguide 10, and a computer 15 for controlling the moving speed of the movable stage 14. In this apparatus, the ultraviolet light emitted from the light source 12 is reflected by the total reflection mirror 13, so as to irradiate a specific position of the phase grating 11, whereby only the interference fringe in this part is projected onto the optical waveguide 10. Here, as the computer 15 is used for controlling the moving speed of the movable stage 14, the ultraviolet irradiation time for the optical waveguide 10 can be controlled. Since the change in refractive index of a photosensitive core corresponds to the ultraviolet irradiation time, the induced refractive index change can be made greater as the ultraviolet irradiation time is longer. When the phase grating 10 is used together, the changing width of refractive index can further be made greater as the ultraviolet irradiation time is longer. Accordingly, the boundary areas 6, in which the changing width of refractive index monotonously changes between Δn and 0, can be formed easily by changing the ultraviolet irradiation time in the boundary areas 6 in its axial direction. For the zero area 3, substantially no change in refractive index would be formed when the ultraviolet light is scanned at a high speed.

Figures 5A, 5B:
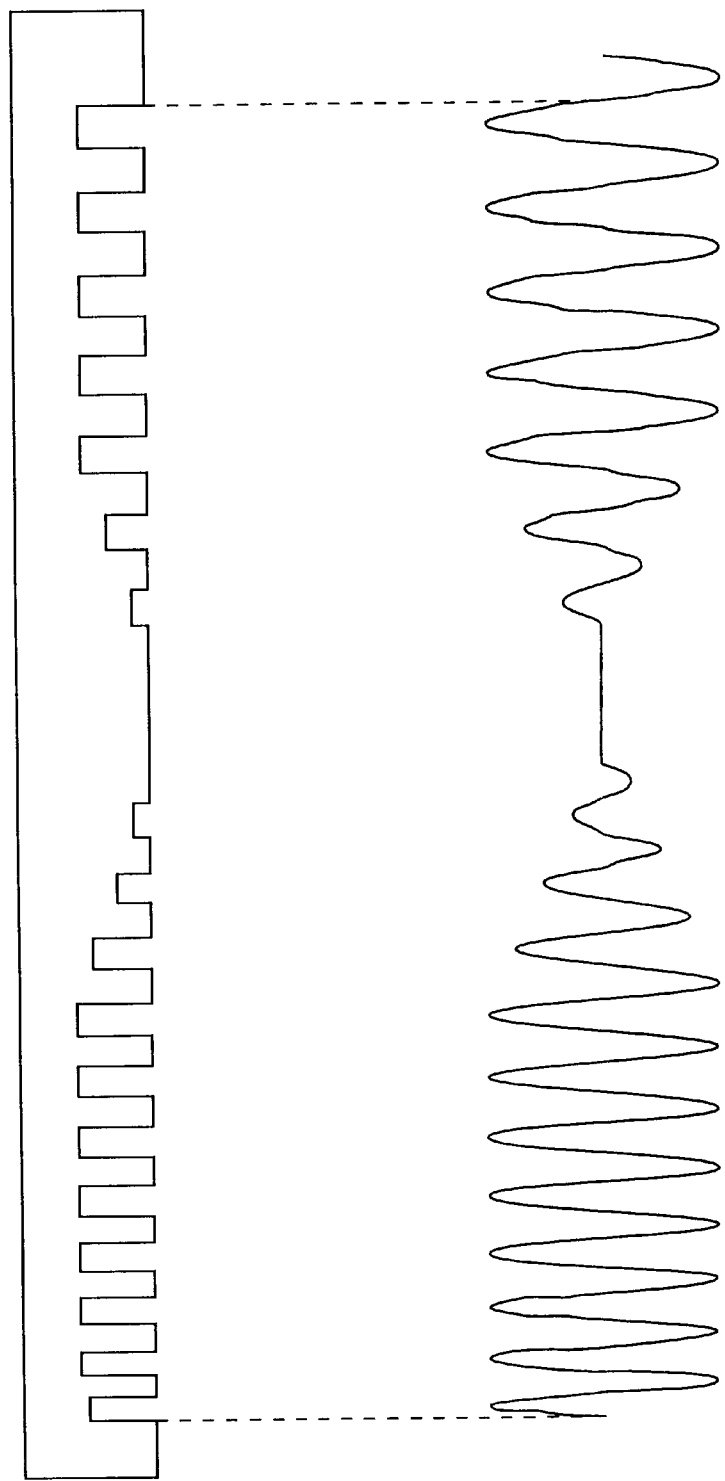

FIG. 5A is a view showing an example of grating pattern in the phase grating 11 used in the apparatus shown in FIG. 4. By use of the interference fringe caused by the diffraction grating 11, a refractive index modulation pattern such as that shown in FIG. 5B can be formed in the optical waveguide 10.

Figure 6:
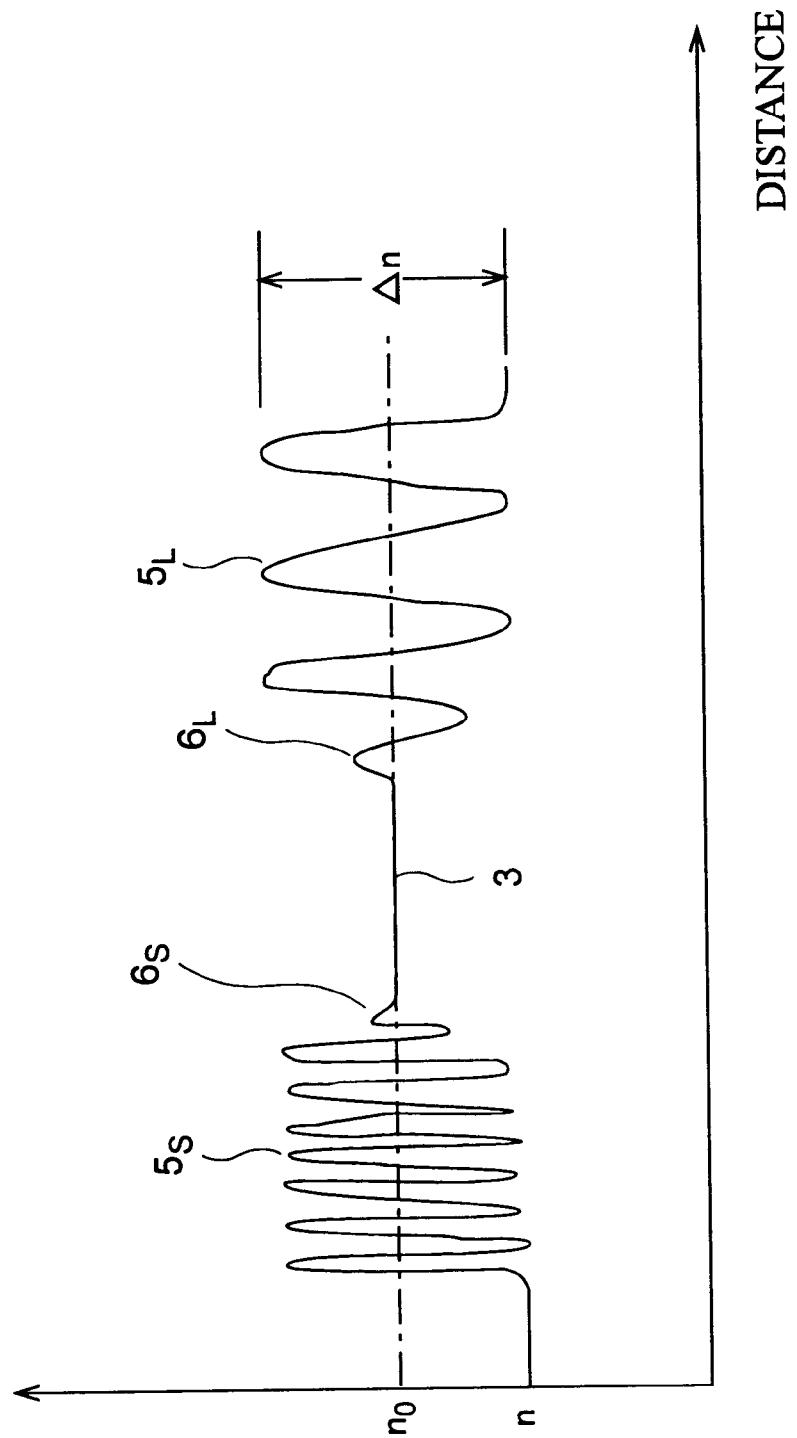
FIG. 6 is a partly enlarged view showing a refractive index distribution in a modified example of the first embodiment.

FIG. 6 is a view showing a refractive index distribution of a band-pass filter in accordance with a modified example of this embodiment, in which the refractive index of the zero area 3 does not coincide with the refractive index n of the core. The embodiment shown in FIG. 2 differs therefrom in that the refractive index of the zero area 3 coincides with the refractive index n of the core. The case where the refractive index of the zero area 3 coincides with the average refractive index $n_0$ is advantageous in that the reflection characteristic of the filter becomes stable since the average refractive index $n_0$ would not change even when the intervals between the zero area 3 and the periodic refractive index variable areas 5 are modified.

In the following, effects of providing the boundary areas 6 between the zero area 3 and the periodic refractive index variable areas $5_S$, $5_L$ will be experimentally studied.

Figure 7A:
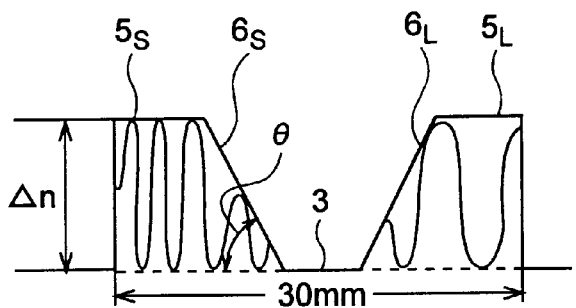
Figure 7B:
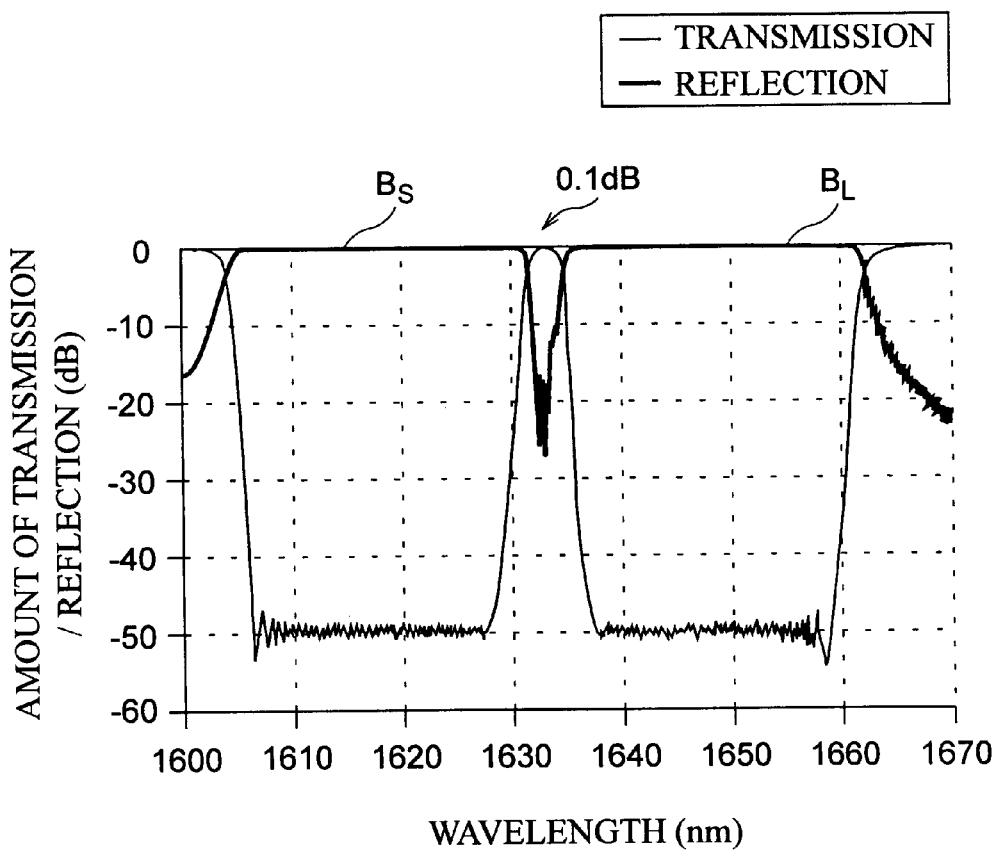
FIG. 7B is a graph showing wavelength characteristics of transmission and reflection thereof.

FIG. 7A is a view showing a refractive index profile of a band-pass filter in this embodiment, whereas FIG. 7B is a graph showing wavelength characteristics of its transmission and reflection. Specifically, FIG. 7A is a view showing a refractive index profile of a band-pass filter in which boundary areas 6, whose changing width of refractive index monotonously changes between Δn and 0, are formed between the zero area 3 and the periodic refractive index variable areas 5. In each boundary area 6, the changing width of refractive index linearly changes between Δn and 0 along an angle of inclination θ with respect to the optical axis, and the length of its tilted part in the optical axis direction is 1.5 mm. The band-pass filter 7 has a length of 30 mm; the chirp ratio in the periodic refractive index variable areas 5 and boundary areas 6 is 1.87 nm/mm; and Bragg wavelengths at the first and second ends are 1,604 nm and 1,660 nm, respectively. Here, "chirp ratio" refers to amount of change in Bragg wavelength per unit optical axis length (nm/mm). Also, the changing width Δn of refractive index is $5 \times 10^{-3}$. The profile at each end portion changes from Δn to 0 in a stepwise fashion. FIG. 7B is a graph showing wavelength characteristics of transmission and reflection of the band-pass filter 7 having the refractive index profile shown in FIG. 7A.

When the boundary areas 6 disposed between the zero area 3 and the periodic refractive index variable areas 5 are formed with a monotonously changing refractive index profile, the transmission and reflection characteristics would be improved such that, as shown in FIG. 7B, the loss in the transmission region A decreases to 0.1 dB, which is allowable for a filter. The reflection power of the out-band regions $C_L$, $C_S$, however, may not decrease sufficiently (which will be explained later in detail).

Also, the inventors have studied transmission loss yielded when the angle of inclination θ in the boundary areas 6 is changed in the variable refractive index profile of the band-pass filter shown in FIG. 7A. As a result, it has been found that transmission loss is maximized when the refractive index profile of the boundary areas 6 is changed from Δn to 0 or vice versa in a stepwise fashion, whereas it decreases as the angle of inclination θ is made smaller. Therefore, it is necessary for the tilted part to be formed with at least one grating 4. It is assumed that, when the variable refractive index is rapidly changed from Δn to 0 or is repeatedly decreased or increased, reflections caused by the gratings 4 forming the chirp grating 5 become complicated, thereby enhancing the transmission loss within the transmission wavelength band A.

Figure 8:
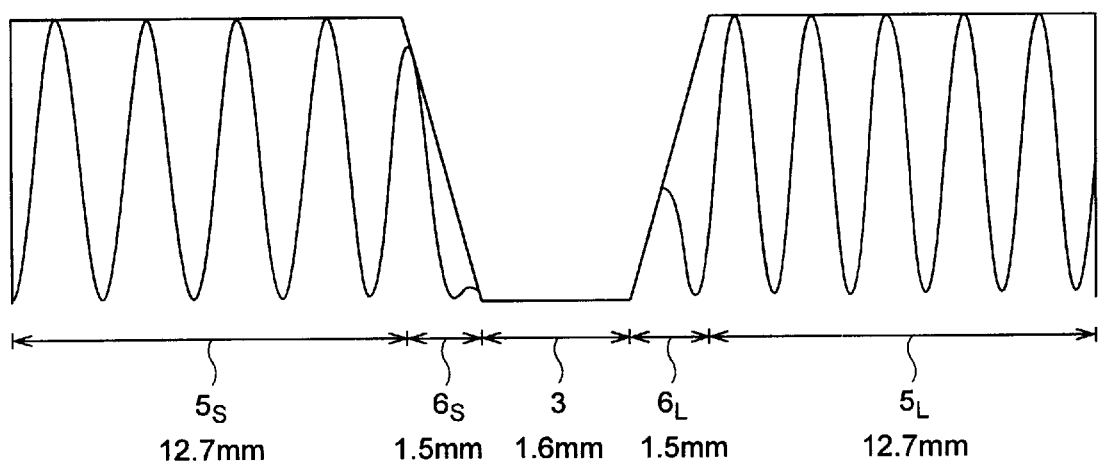
FIG. 8 is a view showing a refractive index profile in another modified example of the first embodiment.

While the method explained with reference to FIGS. 4, 5A, and 5B can be employed in order to make these band-pass filters, a specific method thereof will now be explained. Making of a band-pass filter with a refractive index profile shown in FIG. 8 will be exemplified. Here, the periodic refractive index variable areas 5 respectively disposed on both sides each have a length of 12.7 mm, the boundary areas 6 continuous therewith each have a length of 1.5 mm, and the zero area 3 disposed at the center has a length of 1.6 mm. The apparatus shown in FIG. 4 was used for irradiating ultraviolet light while scanning it in the axial direction. Two band-pass filters were prepared with different irradiation speeds for their individual areas, and their transmission and reflection characteristics were compared with each other. Table 1 shows ultraviolet scanning speeds in the respective cases.

TABLE 1

|  |  | SCANNING SPEED OF ZERO AREA | SCANNING SPEED OF PERIODIC REFRACTIVE INDEX VARIABLE AREA |
|---|---|---|---|
| EXAMPLE A |  | 3 mm/sec | 0.5 mm/min |
| EXAMPLE B | $1^{st}$ | 3 mm/sec | 0.5 mm/min |
|  | $2^{nd}$ | 0.6 mm/sec | 0.1 mm/min |
|  | $3^{rd}$ | 0.24 mm/sec | 0.04 mm/min |

Figure 9:
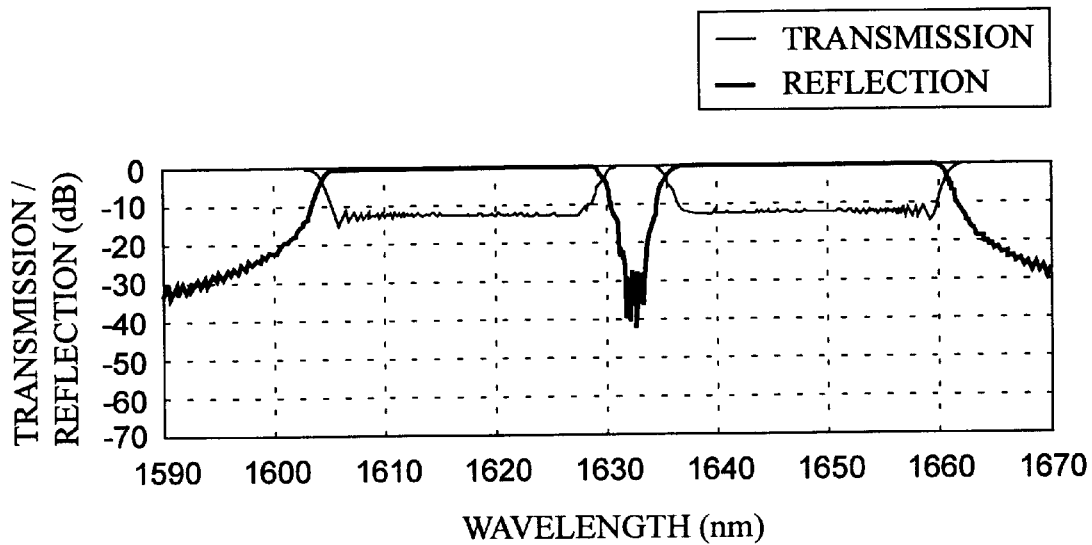
FIG. 9 is a view showing transmission and reflection characteristic of Example A made such as to have the refractive index profile shown in FIG. 8.
Figure 10:
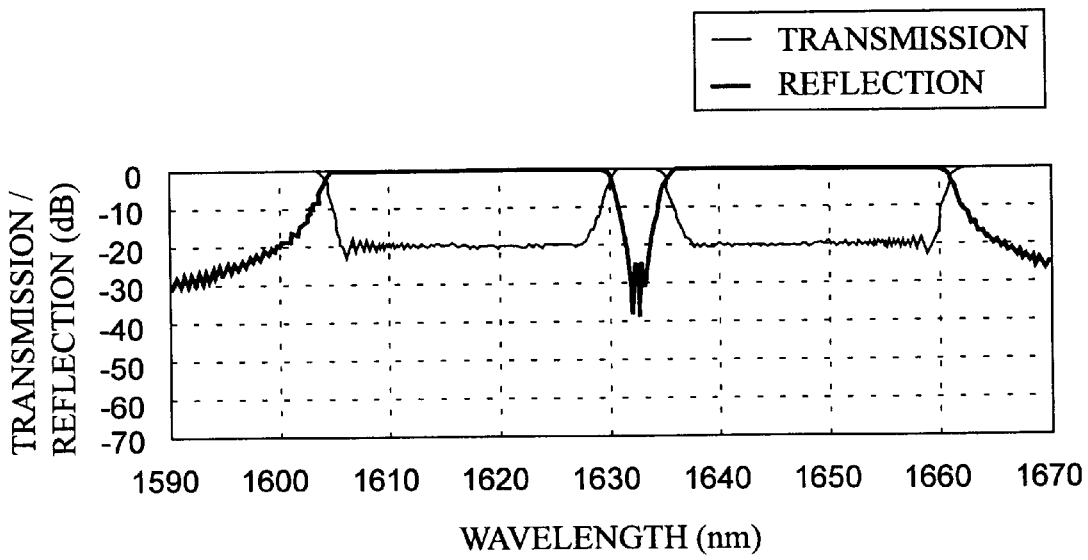
FIG. 10 is a view showing transmission and reflection characteristics of Example B made such as to have the refractive index profile shown in FIG. 8.

In Example B, irradiation was effected three times with different scanning speeds. Within the boundary areas 6, the scanning speed was linearly changed between that of the zero area 3 and that of the refractive index variable areas 5. FIGS. 9 and 10 show the reflection and transmission characteristics of Examples A and B, respectively.

It can be seen that, as the ultraviolet light is repeatedly irradiated, the irradiation time becomes longer, thereby improving the reflection characteristic in the refractive index variable areas. As irradiation is repeated while these spectral characteristics are monitored, a filter having a predetermined reflection characteristic can be made easily.

Figure 11A:
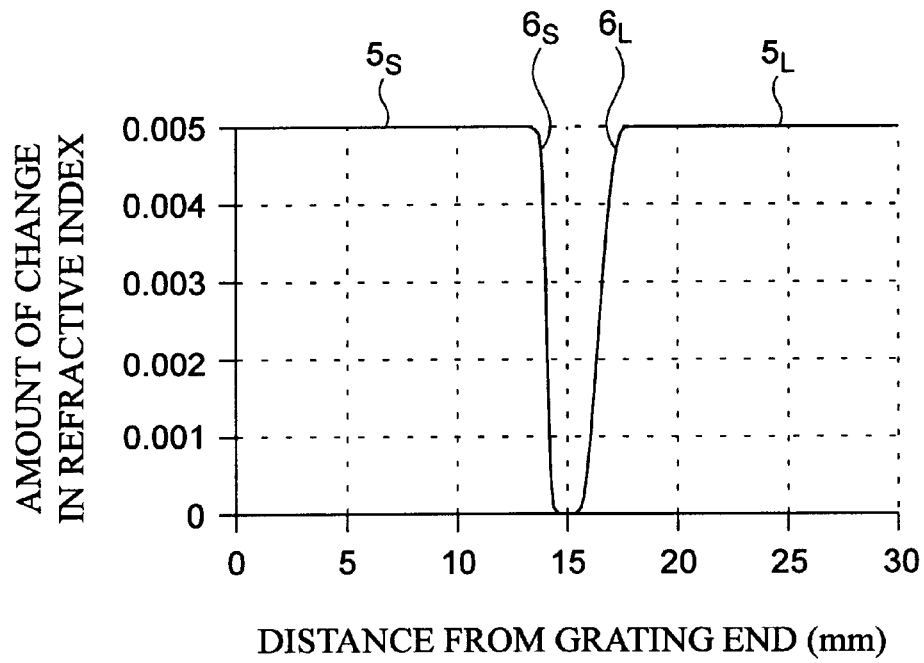
FIG. 11A is a view showing a refractive index profile of still another modified example of the first embodiment.
Figure 11B:
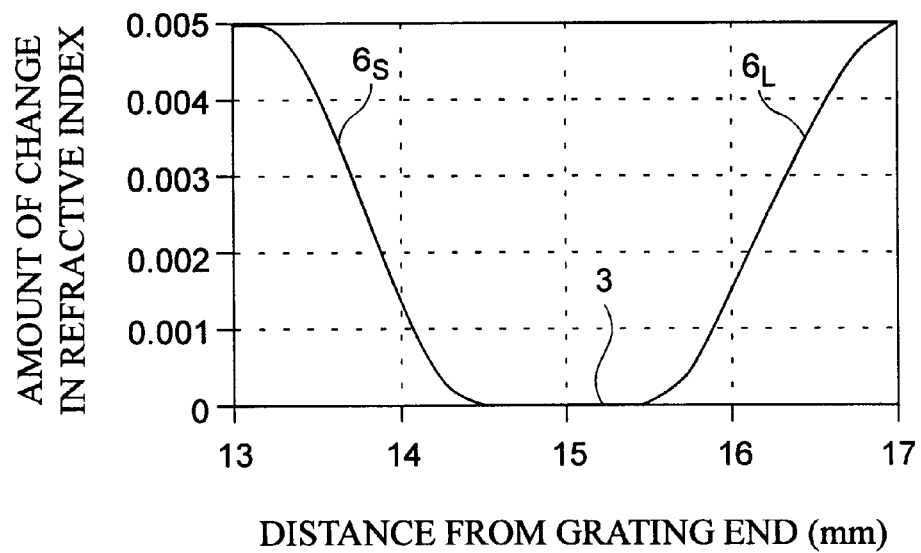
FIG. 11B is an enlarged view thereof.
Figure 11C:
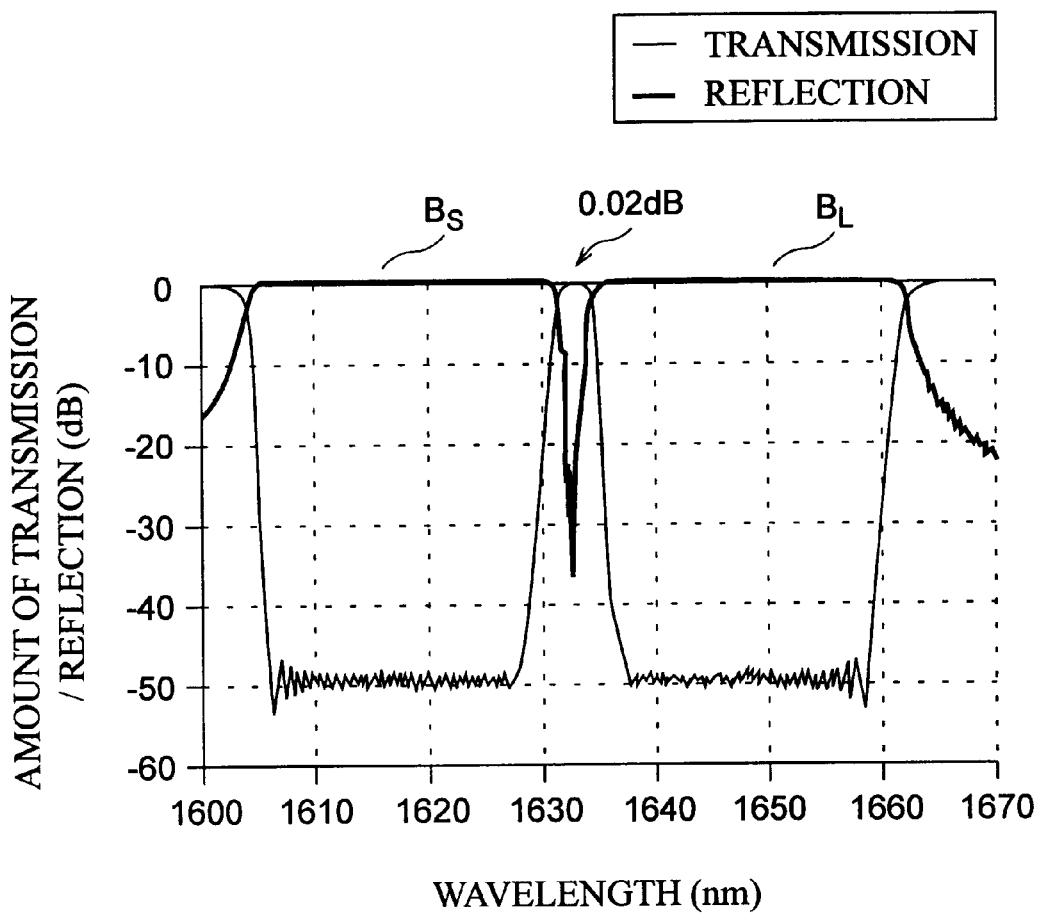
FIG. 11C is a graph showing wavelength characteristics of transmission and reflection thereof.

FIG. 11A is a view showing a refractive index profile of a band-pass filter in this embodiment in the case where the fluctuation in refractive index in the boundary areas changes along a predetermined curve; FIG. 11B is an enlarged view showing the proximity of the boundary areas; and FIG. 11C is a graph showing wavelength characteristics of its transmission and reflection.

Specifically, FIG. 11A is a view showing the amount of change in refractive index in the case where, assuming that the length of each boundary area 6 is L, a given position in the axial direction is x from the origin located at the interface between the boundary area 6 and the zero area 3, i.e., position from which refractive index begins increasing, and the changing width of refractive index in the periodic refractive index variable area 5 continuous with the boundary area 6 is Δn, the changing width of refractive index in the boundary area 6 is changed in conformity to:

$$\Delta n \cdot \cos^2(\pi(L-x)/2L) \qquad (1)$$

whereas FIG. 11B is an enlarged view of the amount of change in refractive index in the zero area 3 and the boundary areas 6 sandwiching it therebetween. The refractive index profile at each end of the filter is changed from Δn to 0 in a stepwise fashion.

The band-pass filter 7 has a length of 30 mm; the chirp ratio in the periodic refractive index variable areas 5 and boundary areas 6 is 1.87 nm/mm; and Bragg wavelengths at the first and second ends are 1,604 nm and 1,660 nm, respectively. The changing width Δn of refractive index is 5×10⁻³. The length L of each boundary area 6 in the optical axis direction is 1.5 mm.

As shown in FIG. 11C, the transmission and reflection wavelength characteristics of the band-pass filter 7 having such a refractive index profile are improved such that the loss in the transmission region A decreases to 0.02 dB, which is sufficiently allowable for a filter. By contrast, as mentioned above, the reflection power in the outside areas $C_L$, $C_S$ may not decrease sufficiently.

Various kinds of functions can be used as the function for defining the fluctuation in refractive index of the boundary areas in this embodiment. For example, the changing width of refractive index in the boundary areas can be changed with respect to a predetermined constant a in conformity to:

$$\Delta n \cdot [\cos(\pi(L-x)/2L)]^a \qquad (2)$$

Figure 12:
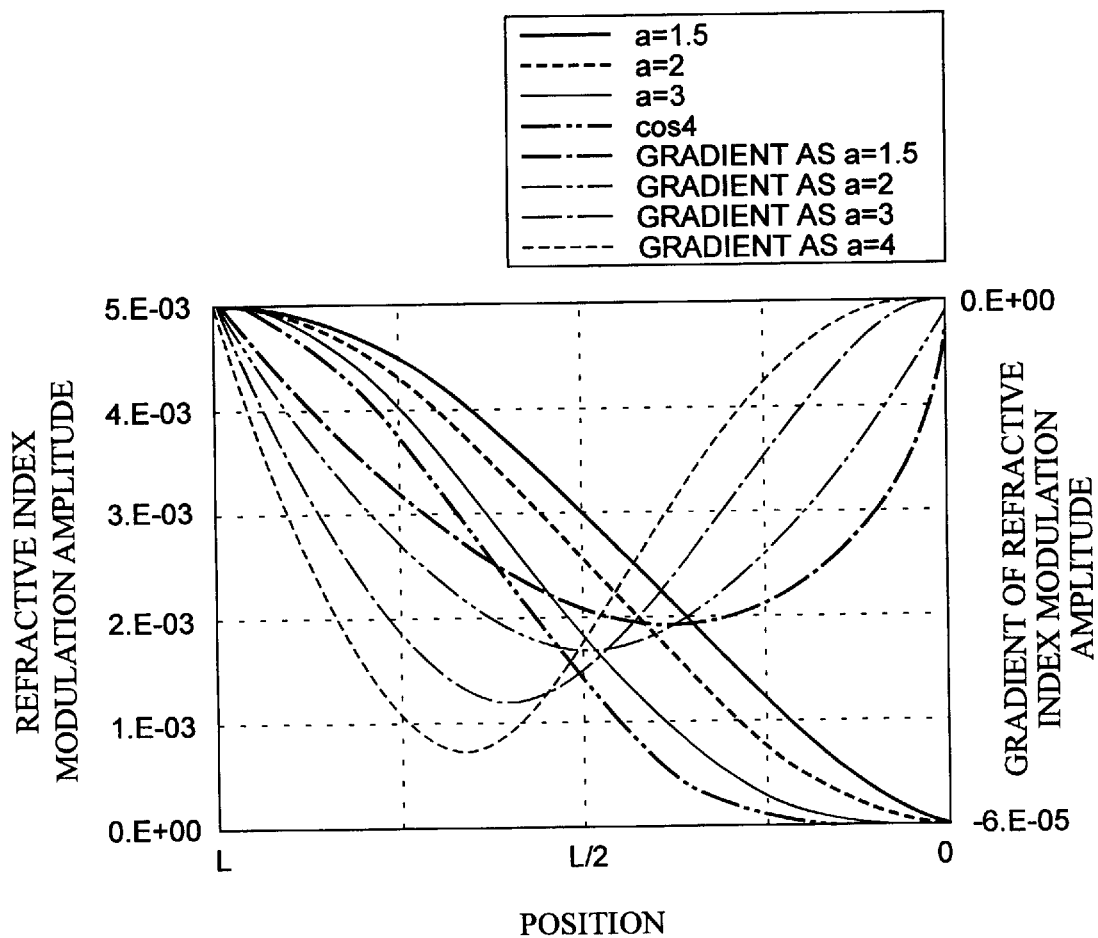
FIG. 12 is a view showing examples in which the refractive in modulation amplitude in boundary areas and its gradient are changed by use of cos exponential functions.
Figure 13:
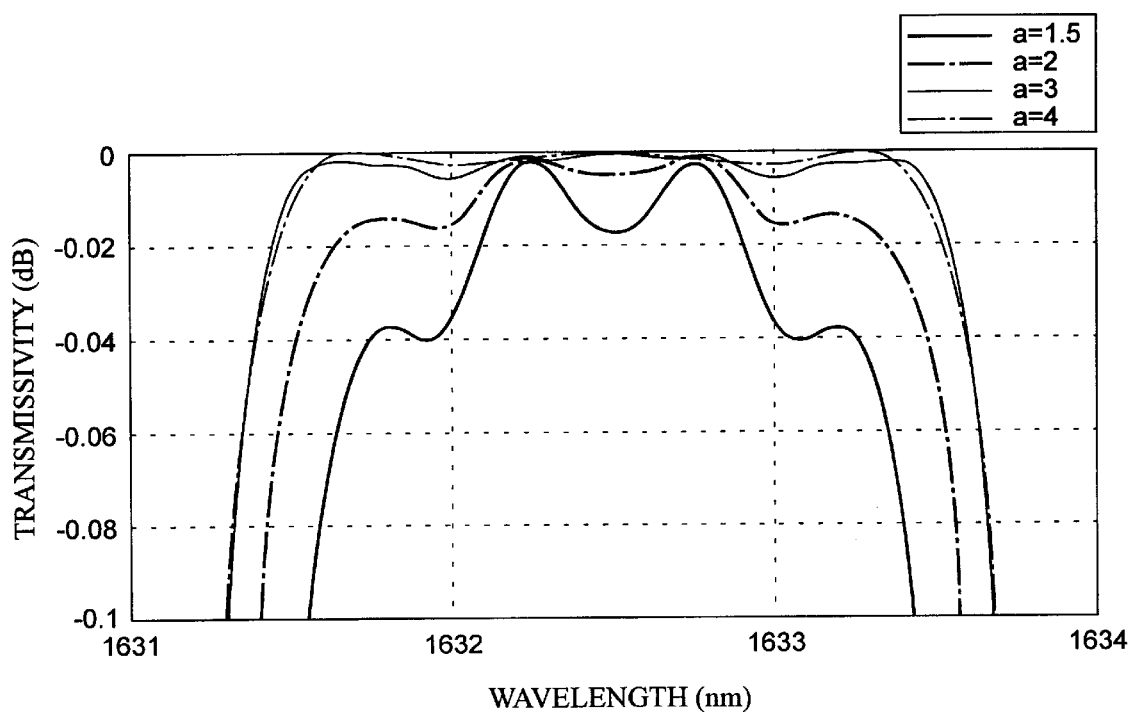
FIG. 13 is a view showing a transmission wavelength characteristic of a transmission region in a band-pass filter of the present invention in which the refractive index modulation amplitude in boundary areas is changed in conformity to FIG. 12.

FIG. 12 shows how the refractive index changing amplitude and gradient (changing rate) of amplitude width in the boundary areas would change when a varies among 1.5, 2, 3, and 4. FIG. 13 is a view showing a transmission characteristic when the changing width of refractive index in the boundary areas is changed in conformity to these functions. It can be seen that, as a increases, the part having a high transmissivity expands, while the transmissivity at the boundaries of the transmission region acutely changes, thereby improving the filtering performance.

Figure 14:
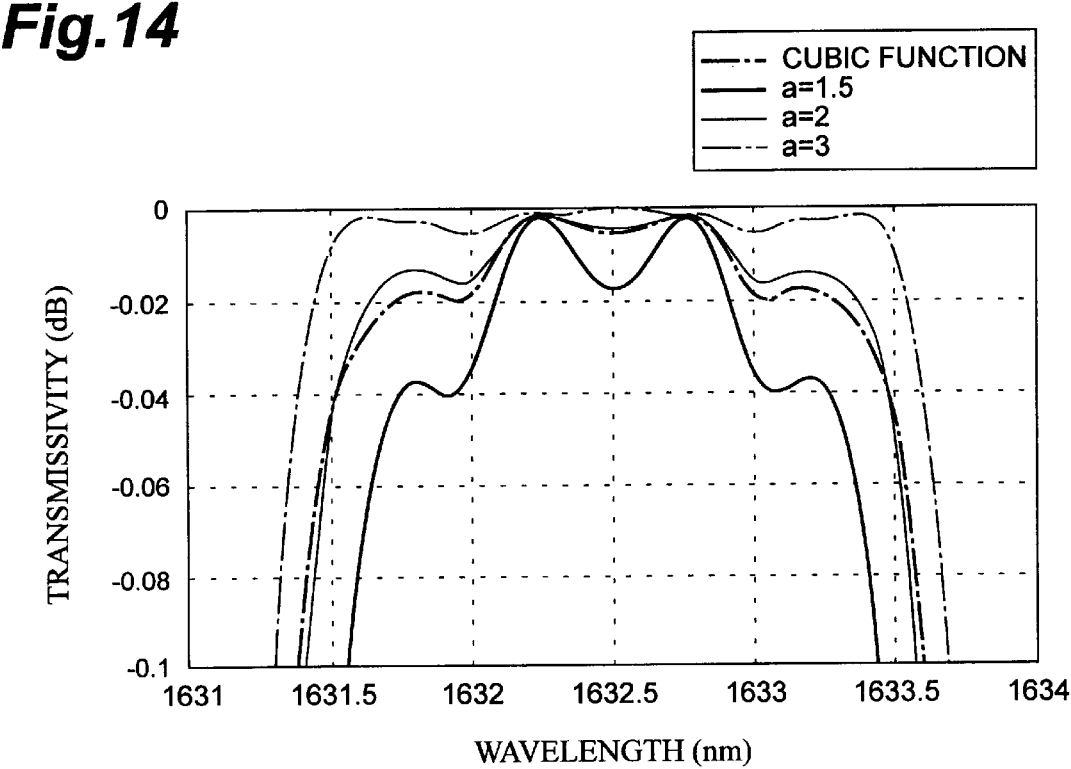
FIG. 14 is a view showing a transmission wavelength characteristic of a transmission region in a band-pass filter of the present invention in which the refractive index modulation amplitude in boundary areas is changed by use of a cubic function.

FIG. 14 shows, by comparison with transmission characteristic of the case where the changing width of refractive index in the boundary areas is changed in conformity to expression (2), the transmission characteristic of the case where their changing width of refractive index is changed by use of a cubic function in conformity to:

$$\Delta n[-2(x/L)^3 + 3(x/L)^2] \qquad (3)$$

This case also yields effects similar to those obtained when the refractive index is changed in conformity to $\cos^2$ functions.

Further, the changing width of refractive index in the boundary areas may be changed in conformity to a combination of two quadratic functions:

$$\Delta n \cdot L/x_0 (x/L)^2 \quad 0 < x < x_0$$

$$\Delta n \cdot \{(x-L)^2/[L(x_0-L)]+1\} x_0 \leq x < L$$

Figure 15:
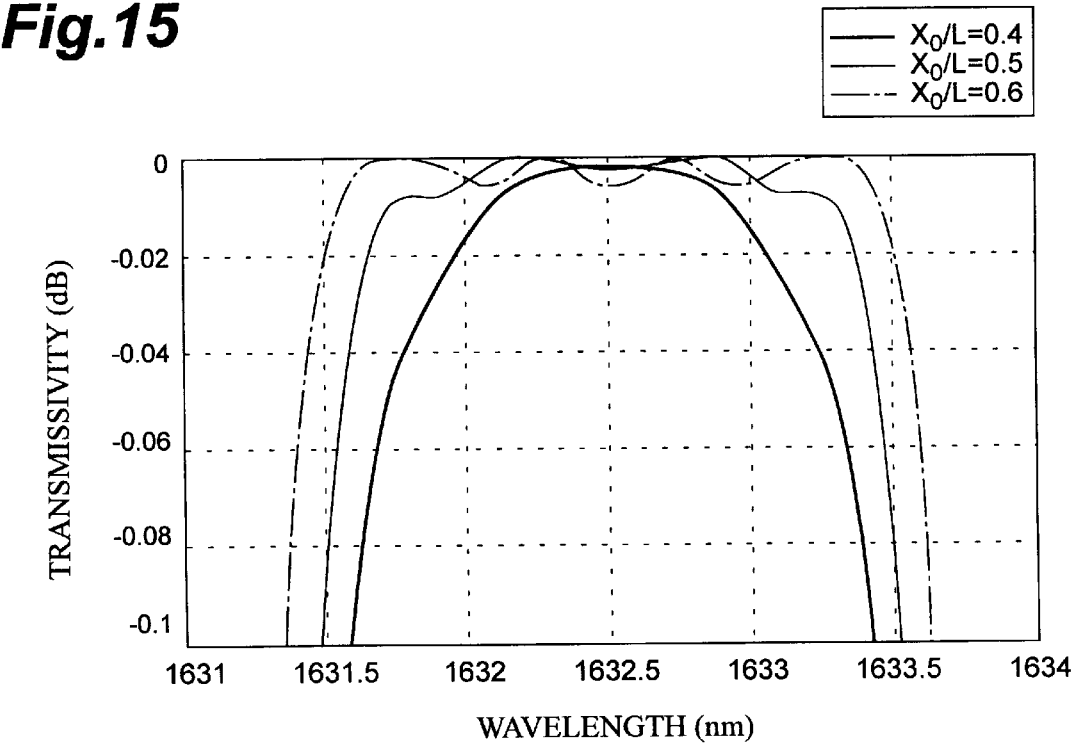
FIG. 15 is view showing a transmission wavelength characteristic of a transmission region in a band-pass filter of the present invention in which the refractive index modulation amplitude in boundary areas is changed by use of quadratic functions.

Here, $x_0$ indicates the position of a given inflexion point. FIG. 15 shows transmission characteristics in the cases where $x_0/L$ is changed among 0.4, 0.5, and 0.6. It can be seen that, as the inflexion point is farther distanced from the zero area, the transmission region expands, and the transmissivity at the boundaries of the transmission regions acutely changes.

From these results, it has been found that, the changing width of refractive index in the boundary areas is preferably monotonously increased from the zero area to their corresponding periodic refractive index variable areas, and the function defining this changing width is more preferably a function having an inflexion point at a position separated from the zero area by more than L/2 which is half the width L of each boundary area. It is presumed to be because of the fact that unnecessary reflection in the proximity of the zero area can be prevented from occurring when the changing width is defined by such a function.

In the following, blocking characteristics of the blocking wavelength regions $B_L$, $B_S$ in this diffraction grating type band-pass filter will be explained in detail.

One of important requirements in a band-pass filter is that transmitted light in the blocking wavelength regions $B_L$, $B_S$ has a low power. In the band-pass filter 7 employing the diffraction grating 4, such as that in this embodiment, the power of light reflected by the diffraction grating is determined by the changing width Δn of refractive index in the periodic refractive index variable areas 5 and the chirp ratioΔP that is a ratio (nm/mm) by which the Bragg wavelength changes per unit optical axis length. Namely, when the changing width Δn of refractive index is too small, the power reflected according to the period of each grating becomes small, whereby light cannot be blocked sufficiently. When the chirp ratio is too high, on the other hand, the gap between adjacent Bragg wavelengths becomes greater, thus failing to sufficiently reflect a light component having a wavelength corresponding to that therebetween.

Figure 16:
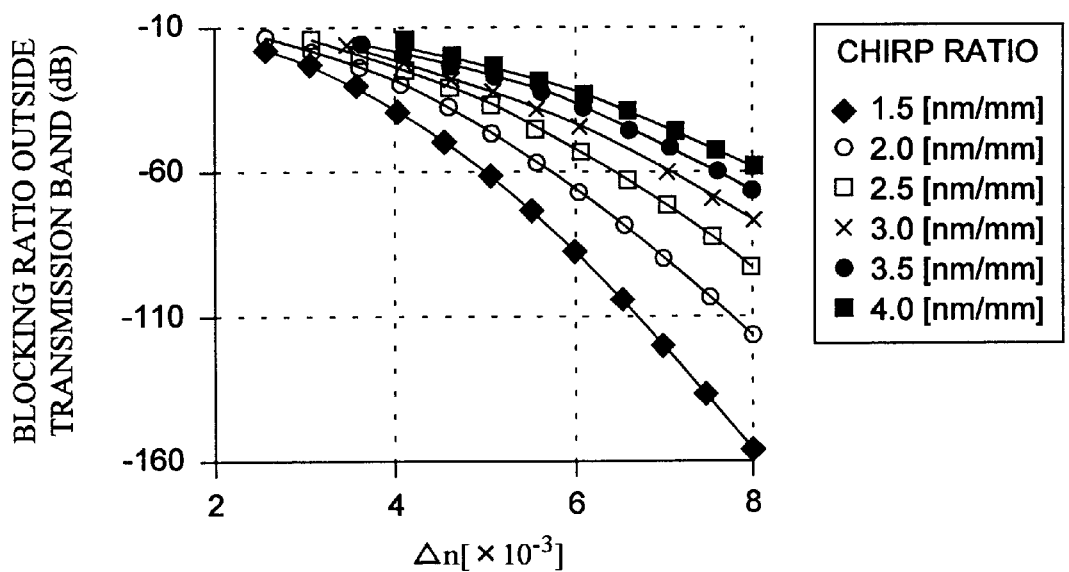
FIG. 16 is a graph showing a relationship between Δn of the diffraction grating type band-pass filter in accordance with the first embodiment and its blocking ratio.

Therefore, the inventors have experimentally studied the relationship between the ratio of transmitted power to incident power in the blocking wavelength region (referred to as "blocking ratio") and the changing width Δn of refractive index, using the chirp ratio AP as a parameter. FIG. 16 shows the results thereof. Namely, FIG. 16 is a graph showing the relationship between the changing width Δn of refractive index and the blocking ratio, using the chirp ratio ΔP as a parameter. As can be seen from this drawing, the blocking ratio becomes greater as the chirp ratio is smaller, and as the changing width Δn of refractive is made greater thereby enhancing the Bragg reflection. It seems to be the first attempt to thus obtain a desired blocking ratio by use of the changing width Δn of refractive index and the chirp ratio ΔP.

Figure 17:
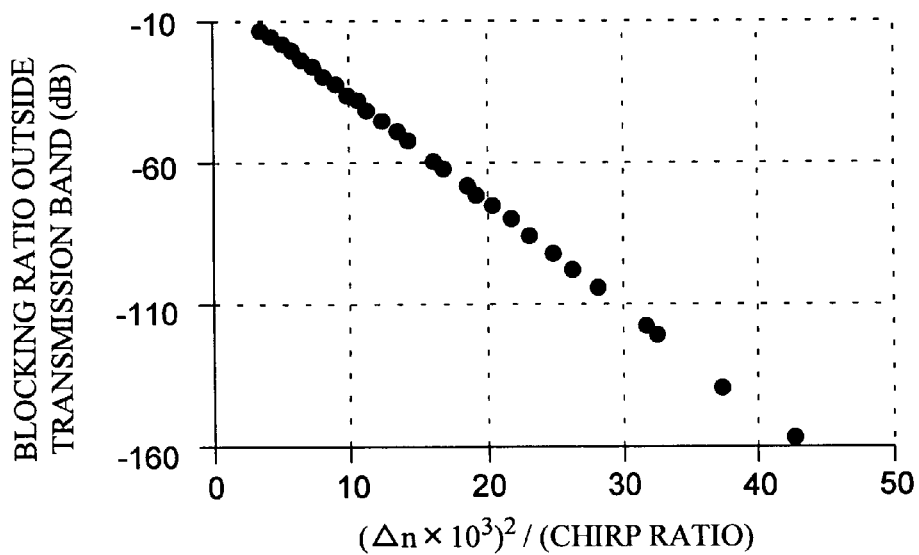
FIG. 17 is a graph showing a relationship between $(\Delta n)^2/\Delta P$ of the diffraction grating type band-pass filter in accordance with the first embodiment and its blocking ratio.

When the blocking ratio and $(\Delta n)^2/\Delta P$ shown in FIG. 16 are plotted on a predetermined graph, they are displayed linearly as shown in FIG. 17. Accordingly, the blocking ratio of the band-pass filter 7 in this embodiment is expressed by:

blocking ratio=$-3.67 \times (\Delta n)^2 \times 10^6/\Delta P$

Usually, in the blocking region of a band-pass filter, the blocking ratio is preferably not greater than −10 dB. In order to obtain such a blocking characteristic, from the above-mentioned expression, a relationship of $-3.67 \times (\Delta n)^2 \times 10^6/\Delta P \leq -10 \text{(dB)}$ is obtained. The band-pass filter 7 having a favorable blocking characteristic can be formed when $\Delta n$ and $\Delta P$ are selected so as to satisfy this expression.

In the following, reflection loss in the out-band regions $C_L$, $C_S$ in this diffraction grating type band-pass filter will be explained. Since there are cases where signal light in the out-band regions $C_L$, $C_S$ in this diffraction grating type band-pass filter is used in an optical transmission line utilizing the diffraction grating type band-pass filter, one of requirements imposed on the band-pass filter is to prevent unnecessary light from being reflected in these out-band regions.

Figure 18A:
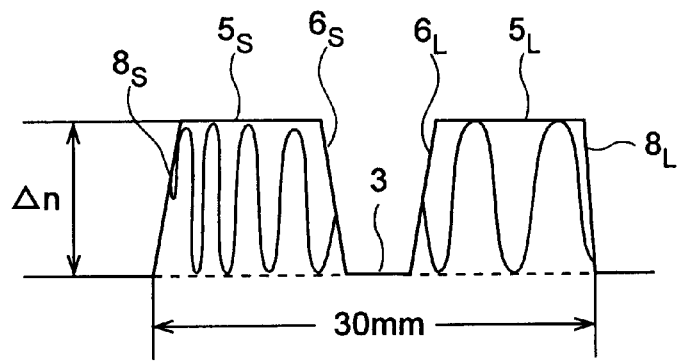
Figure 18B:
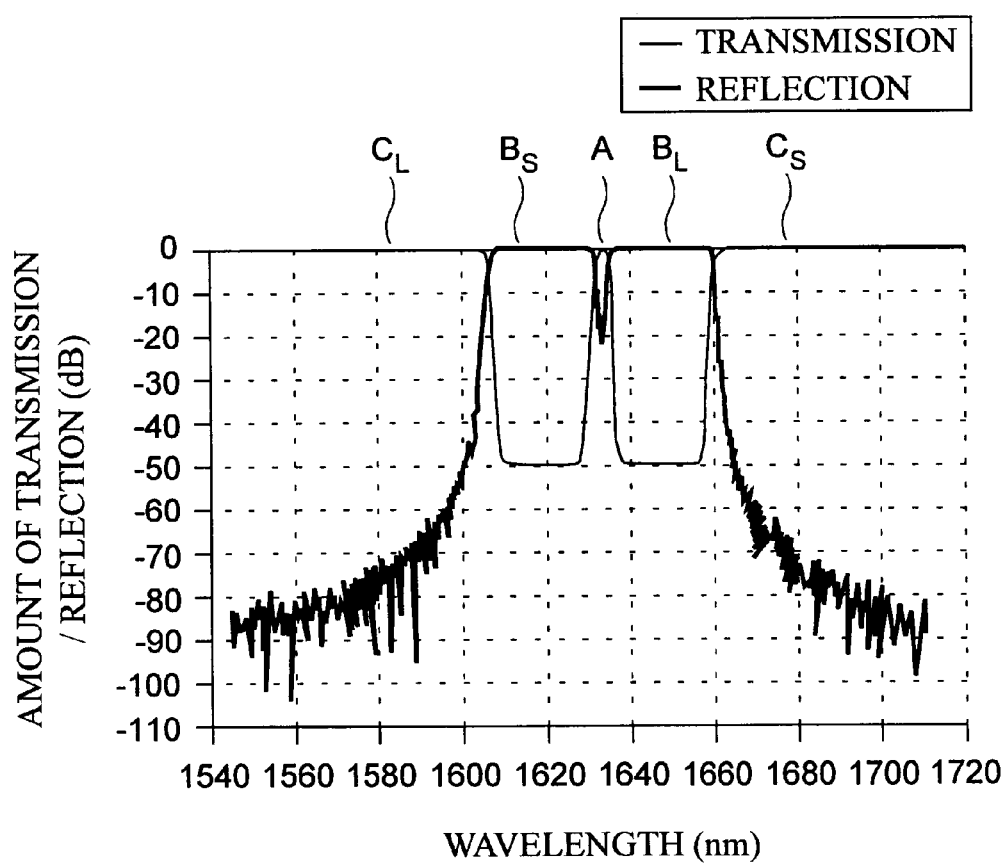
FIG. 18B is a graph showing wavelength characteristics of transmission and reflection thereof.

FIG. 18A is a view showing a refractive index profile of a band-pass filter in accordance with the second embodiment of the present invention, whereas FIG. 18B is a graph showing wavelength characteristics of its transmission and reflection.

As shown in FIG. 18A, this embodiment has end areas 8, respectively disposed at the first and second ends of the optical waveguide, in which the changing width of refractive index monotonously changes between $\Delta n$ and zero. Also, each boundary area 6 has a refractive index profile which changes between $\Delta n$ and zero along a constant angle of inclination with respect to the optical axis, and its length in the optical axis direction is 1.5 mm. The band-pass filter 7 has an overall length of 30 mm; the chirp ratio in the periodic refractive index variable areas 5 and boundary areas 6 is 1.87 nm/mm; and Bragg wavelengths at the first and second ends are 1,604 nm and 1,660 nm, respectively. The changing width $\Delta n$ of refractive index is $5 \times 10^{-3}$.

The reflection characteristic of the band-pass filter in this embodiment shown in FIG. 18B indicates that the reflection power of the out-band regions $C_L$, $C_S$ rapidly decreases as their wavelengths differ from those of the blocking wavelength regions $B_L$, $B_S$ repectively. It is presumed that, when the end areas 8 in which the changing width of refractive index monotonously changes between An and 0 are thus provided, reflections generated by combinations of the respective gratings 4 forming the periodic refractive index variable areas 5 and end areas 8 cancel each other, thereby decreasing the reflection light generated outside the band and its power. Accordingly, the band-pass filter 7 of this embodiment can lower the power of reflected light which may interfere with and affect other signal light components transmitting the out-band regions $C_L$, $C_S$.

Figure 19A:
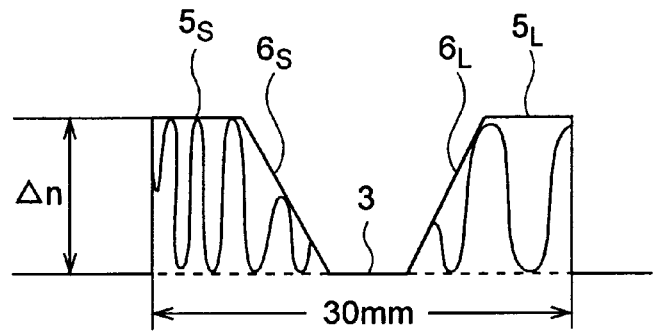
Figure 19B:
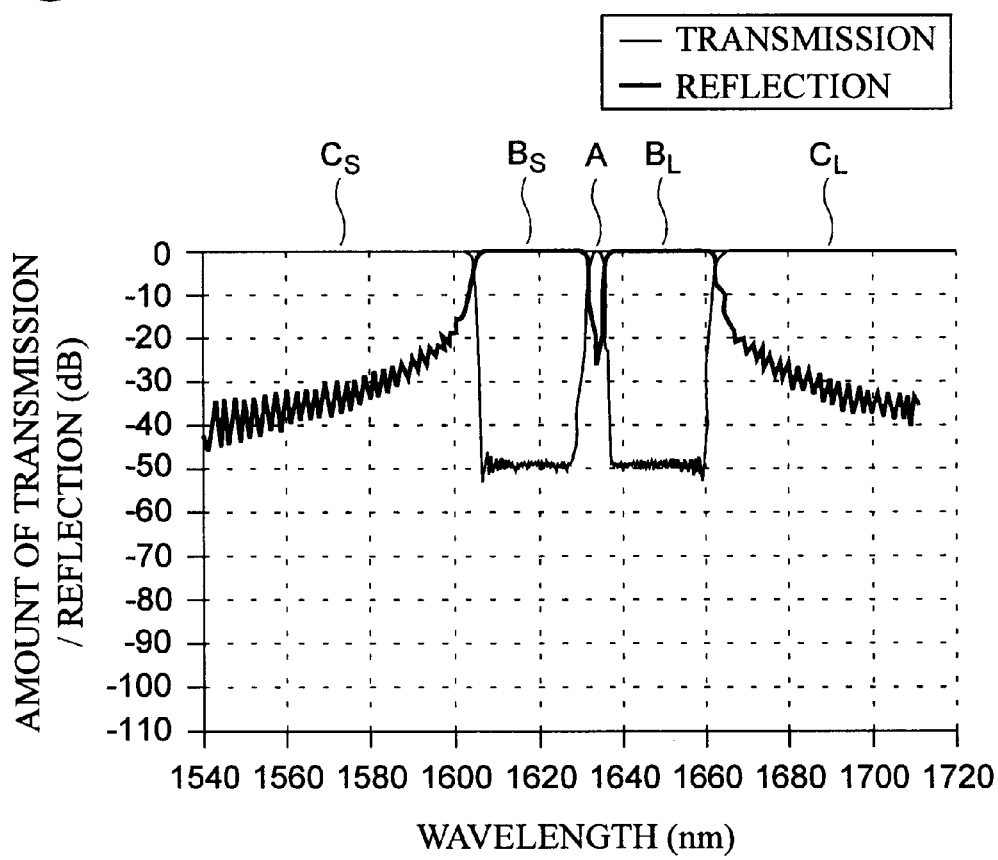
FIG. 19B is a graph showing wavelength characteristics of transmission and reflection thereof.

Meanwhile, FIG. 19A is a view showing a refractive index profile of a band-pass filter having substantially the same configuration as that shown in FIG. 18A except that it does not comprise the end areas 8. The transmission and reflection characteristics of the band-pass filter 7 having such a refractive index profile are improved such that the loss in the transmission region A decreases to 0.1 dB as shown in FIG. 19B. Since the refractive index at both end portions of the periodic refractive index variable areas 5 changes in a stepwise fashion, however, reflection power remains in the out-band regions $C_L$, $C_S$, whereby the quantity of reflected light cannot be reduced to such an extent that they do not affect other signal light components transmitting these regions.

Figures 20A, 20B:
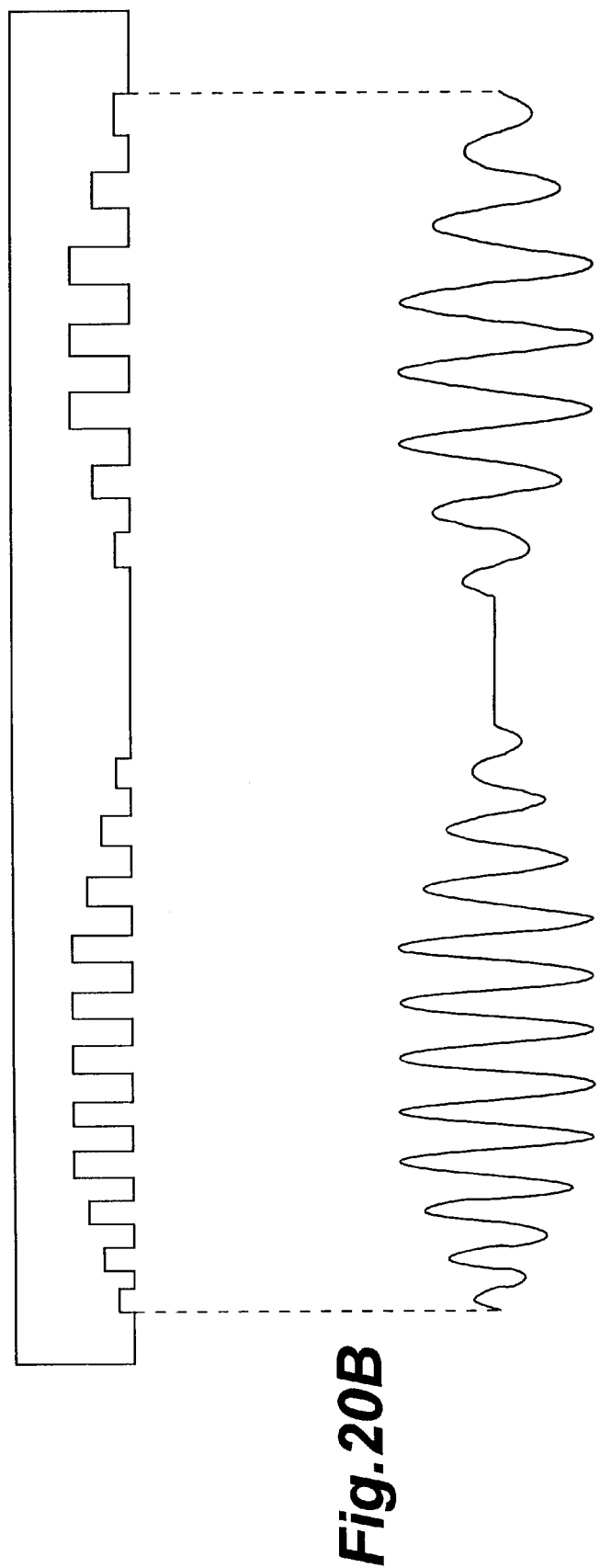

In order to make the band-pass filter of this embodiment, a phase mask having a grating pattern shown in FIG. 20A may be used in a manufacturing system shown in FIG. 4. As a consequence, a refractive index modulation pattern shown in FIG. 20B can be formed on a photosensitive optical waveguide.

Figure 21:
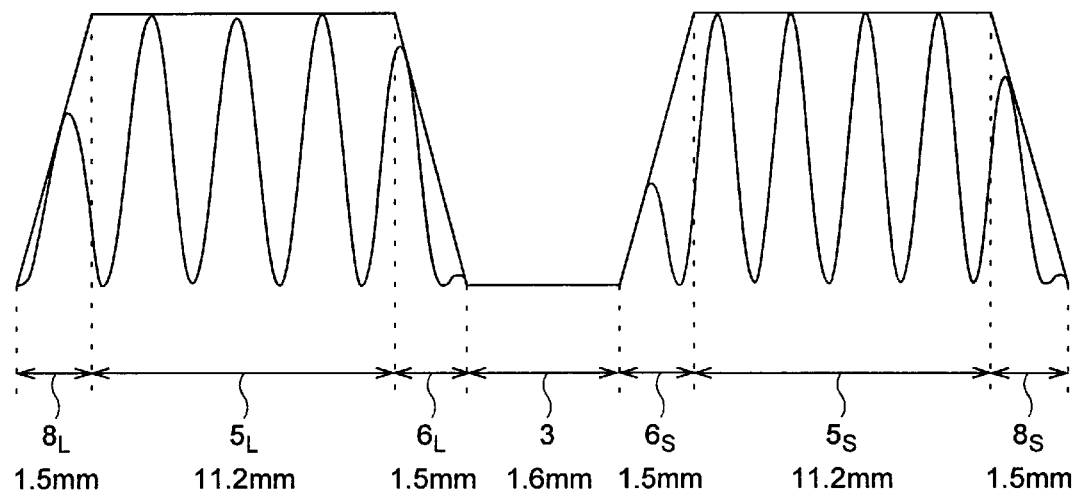
FIG. 21 is view showing a refractive index profile in another modified example of the second embodiment.
Figure 22:
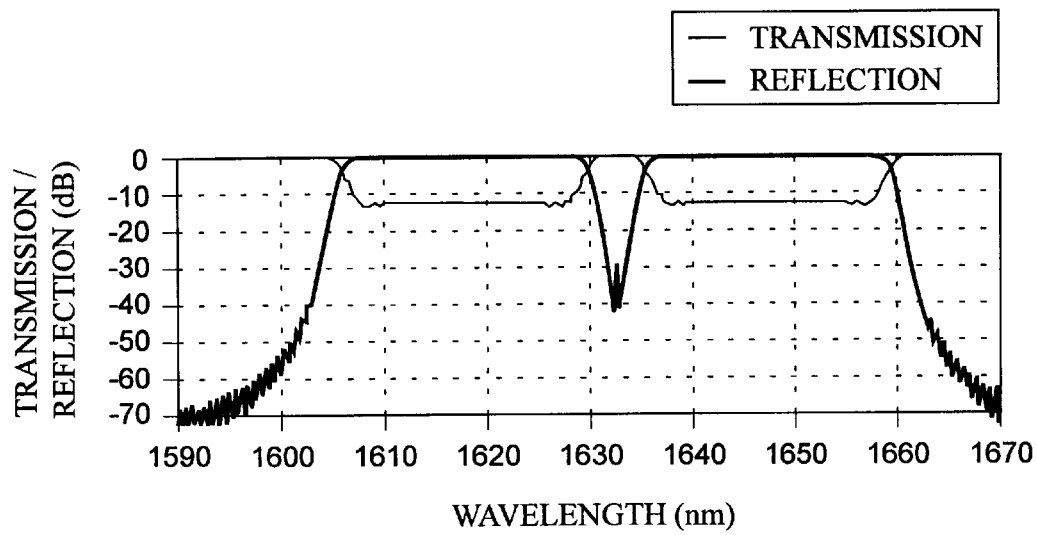
FIG. 22 is a view showing transmission and reflection characteristics of Example A made such as to have the refractive index profile shown in FIG. 21.
Figure 23:
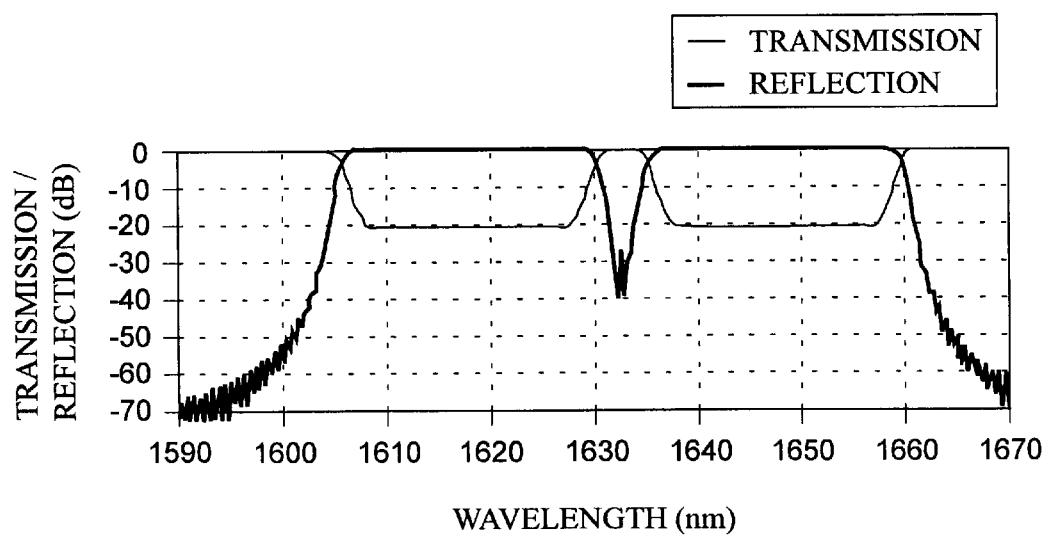
FIG. 23 is a view showing transmission and reflection characteristics of Example B made such as to have the refractive index profile shown in FIG. 21.

A specific manufacturing method will now be explained. The case where a band-pass filter having a refractive index profile shown in FIG. 21 will be exemplified. Here, the periodic refractive index variable areas 5 respectively disposed at both ends each have a length of 11.2 mm, the boundary areas 6 continuous therewith each have a length of 1.5 mm, the zero area 3 disposed at the center has a length of 1.6 mm, and the end areas 8 each have a length of 1.5 mm. The apparatus shown in FIG. 4 was used for irradiating ultraviolet light while scanning it in the axial direction. Two band-pass filters were prepared with different irradiation speeds for their individual areas, and their transmission and reflection characteristics were compared with each other. The scanning speeds in the zero area 3 and refractive index variable areas 5 were identical to those in the examples listed in the above-mentioned Table 1, whereas the scanning speeds in the boundary areas 6 and end areas 8 were linearly changed between the scanning speed in the zero area 3 and the scanning speed in the refractive index variable areas 5. FIGS. 22 and 23 show the transmission and reflection characteristics of Examples A and B, respectively.

It can be seen that, as the ultraviolet light is repeatedly irradiated, the irradiation time becomes longer, thereby improving the reflection characteristic in the refractive index variable areas. As irradiation is repeated while these spectral characteristics are monitored, a filter having a predetermined reflection characteristic can be made easily.

Figure 24:
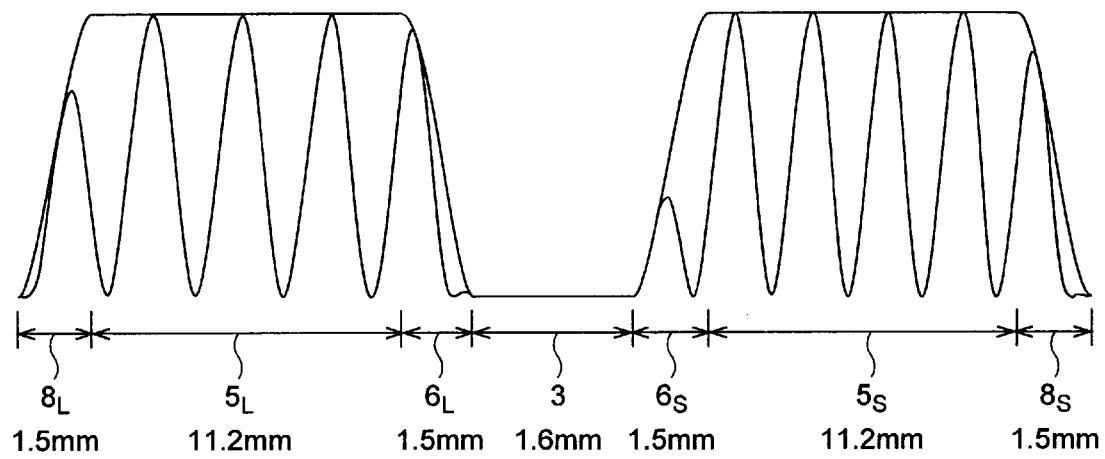
FIG. 24 is a view showing a refractive index profile in still an her modified example of the second embodiment.
Figure 25:
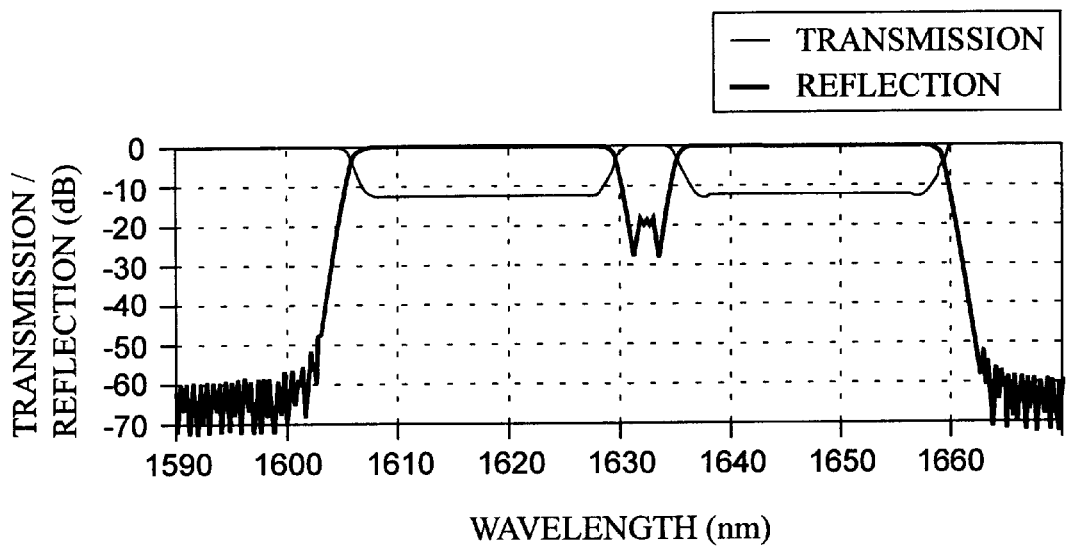
FIG. 25 is a view showing transmission and reflection characteristics of Example A made such as to have the refractive index profile shown in FIG. 24.
Figure 26:
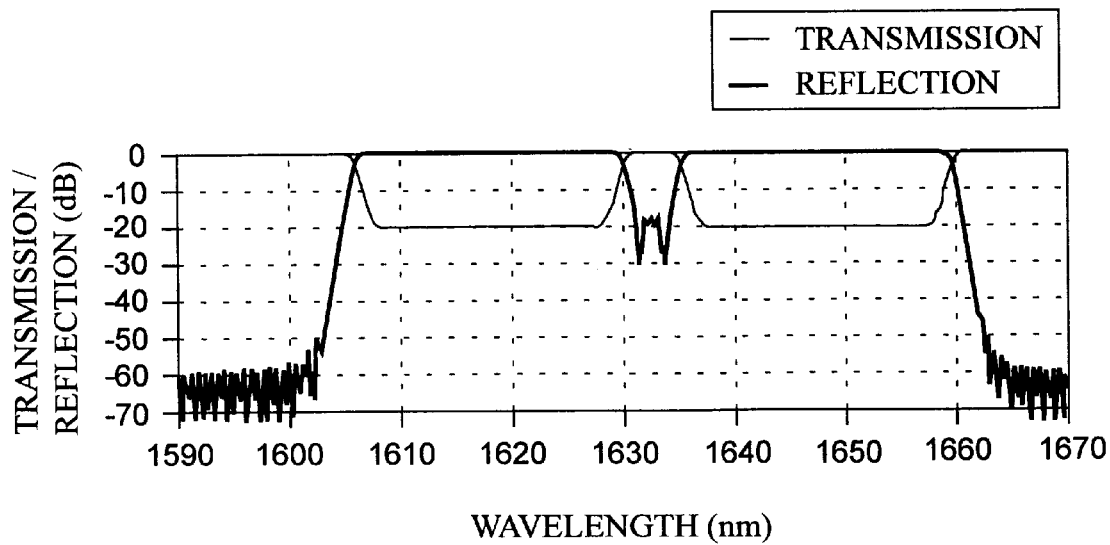
FIG. 26 is a view showing transmission and reflection characteristics of Example B made such as to have the refractive index profile shown in FIG. 24.

The scanning speed in the boundary areas 6 and end areas 8 may be changed not only linearly, but also monotonously by use of a predetermined function. FIG. 24 shows a refractive index in which the scanning speed in these areas is changed by use of a $\cos^2$ function. FIGS. 25 and 26 show the transmission and reflection characteristics of Examples A and B, respectively. As compared with the cases shown in FIGS. 22 and 23 where the scanning speed is linearly changed, it has been confirmed that changes in transmissivity and reflectivity at the boundaries between each blocking region and its corresponding out-band region and zero area become more acute, thereby improving the blocking characteristic.

In the band-pass filter of the present invention, since a boundary area in which the changing width of refractive index monotonously changes is disposed between a periodic refractive index variable area and a zero area, transmission loss within the transmission wavelength region can be improved. Also, an end area in which the changing width of refractive index monotonously changes is disposed at each end portion of the filter, reflected light can be restrained from occurring in regions outside of the band.

In the method of making a band-pass filter in accordance with the present invention, the band-pass filter having a desired characteristic can be made easily and accurately.

This band-pass filter can be favorably used for the purpose of extracting individual signal light components from within a transmission line effecting wavelength division multiplexing transmission, and the like. Since the separation performance is particularly improved in the band-pass filter of the present invention, a transmission line using the band-pass filter of the present invention can shorten the wavelength distance between adjacent signals in the multiplexing transmission, thus allowing the number of transmission channels for the multiplexing transmission to increase.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A diffraction grating type band-pass filter in which a diffraction grating area having a periodic refractive index change along an axial direction is formed within an optical waveguide and is adjusted so as to transmit therethrough light in a predetermined wavelength band;

said diffraction grating area comprising a plurality of areas divided in an optical axis direction and having:

first and second periodic refractive index variable areas in which refractive index is varied with a period monotonously changing along the axial direction with substantially a constant changing width of $\Delta n$ so as to form a plurality of diffraction gratings, the shortest period of one area being longer than the longest period of the other;

a zero area, disposed between said first and second periodic refractive index variable areas, having substantially a constant refractive index; and first and second boundary areas, respectively disposed between said zero area and said first and second periodic variable refractive index areas, in which the changing width of refractive index continuously and monotonously changes between $\Delta n$ and 0.

2. A diffraction grating type band-pass filter according to claim 1, wherein, assuming that the length of each of said first and second boundary areas in their axial direction is L, the changing width of refractive index at a given position in said boundary area separated by a distance of x from a boundary position with respect to said zero area is expressed by $\Delta n \cdot f(x)$ using a given function $f(x)$ which satisfies $f(0)=0$ and $f(L)=1$, said function monotonously smoothly increasing from $x=0$ to L.

3. A diffraction grating type band-pass filter according to claim 2, wherein said given function $f(x)$ is a function having an inflexion point within the range of $L/2 \leq x < L$.

4. A diffraction grating type band-pass filter according to claim 3, wherein said given function $f(x)$ is a function represented by the following expression:

$$f(x) = \cos^2(\pi(L-x)/2L).$$

5. A diffraction grating type band-pass filter according to claim 1, wherein said diffraction grating area further comprises, respectively outside said first and second periodic refractive index variable areas, first and second end areas in which the changing width of refractive index monotonously changes between $\Delta n$ and 0.

6. A diffraction grating type band-pass filter according to claim 1, wherein, assuming that a rate by which Bragg wavelength, determined by a period of said diffraction grating, changes per unit axial length is $\Delta P$ (nm/mm), a blocking ratio defined by a ratio of transmitted power to incident power in said refractive index variable areas satisfies the following expression:

$$-3.67 \times (\Delta n)^2 \times 10^6 / \Delta P \leq -10 \text{ (dB)}.$$

7. A method of making a diffraction grating type band-pass filter, comprising the step of forming a diffraction grating by projecting ultraviolet light by way of a phase mask having a predetermined form onto a ultraviolet-sensitive optical waveguide so as to cast an interference fringe thereon, said interference fringe being projected by irradiating a ultraviolet beam while scanning said ultraviolet beam along an optical axis of said optical waveguide; said scanning being effected at a constant speed of $v_1$ in a first area, with a speed monotonously accelerating from $v_1$ to $v_2$ in a second area continuous from said first area, at a constant speed of $v_2$ in a third area continuous with said second area, with a speed monotonously decelerating from $v_2$ to $v_1$ in a fourth area continuous with said third area, and again at said constant speed of $v_1$ in a fifth area continuous with said fourth area.

8. A method of making a diffraction grating type band-pass filter according to claim 7, wherein, acceleration and deceleration of the scanning speed are carried out in conformity to a $\cos^2$ function, respectively.

9. A method of making a diffraction grating type band-pass filter according to claim 7, wherein scanning is carried out such that, while a spectral characteristic of light transmitted through said optical waveguide is monitored, subsequent to a first ultraviolet beam scanning operation, a second or later ultraviolet beam scanning operation is effected at each point with a scanning speed obtained when a scanning speed at said point upon the previous scanning operation is multiplied by a predetermined coefficient, and said scanning is terminated at a point of time when said spectral characteristic of said transmitted light reaches a desired spectral characteristic.

10. A method of making a diffraction grating type band-pass filter according to claim 9, wherein, acceleration and deceleration of the scanning speed are carried out in conformity to a $\cos^2$ function, respectively.

11. A method of making a diffraction grating type band-pass filter according to claim 7, wherein said scanning is carried out such as to monotonously decelerate from a predetermined speed $v_3$ to $v_1$ in an area precedent to said first area, and monotonously accelerate from $v_1$ to $v_3$ in an area subsequent to said fifth area.

12. A method of making a diffraction grating type band-pass filter according to claim 11, wherein, acceleration and deceleration of the scanning speed are carried out in conformity to a $\cos^2$ function, respectively.

13. A method of making a diffraction grating type band-pass filter according to claim 11, wherein scanning is carried out such that, while a spectral characteristic of light transmitted through said optical waveguide is monitored, subsequent to a first ultraviolet beam scanning operation, a second or later ultraviolet beam scanning operation is effected at each point with a scanning speed obtained when a scanning speed at said point upon the previous scanning operation is multiplied by a predetermined coefficient, and said scanning is terminated at a point of time when said spectral characteristic of said transmitted light reaches a desired spectral characteristic.

14. A method of making a diffraction grating type band-pass filter according to claim 13, wherein, acceleration and deceleration of the scanning speed are carried out in conformity to a $\cos^2$ function, respectively.

* * * * *